(12) United States Patent
Koike

(10) Patent No.: US 9,230,203 B2
(45) Date of Patent: Jan. 5, 2016

(54) CONTROL APPARATUS, CONTROL METHOD, AND STORAGE MEDIUM

(71) Applicant: CANON KABUSHIKI KAISHA, Tokyo (JP)

(72) Inventor: Hisashi Koike, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/340,375

(22) Filed: Jul. 24, 2014

(65) Prior Publication Data

US 2015/0029558 A1 Jan. 29, 2015

(30) Foreign Application Priority Data

Jul. 29, 2013 (JP) ................. 2013-156717

(51) Int. Cl.
*H04N 1/40* (2006.01)
*G06K 15/02* (2006.01)
*G06K 15/00* (2006.01)
*G03G 15/00* (2006.01)

(52) U.S. Cl.
CPC .......... *G06K 15/1894* (2013.01); *G03G 15/502* (2013.01); *G06K 15/005* (2013.01); *G06K 15/1809* (2013.01); *G06K 15/4065* (2013.01); *G06K 15/1821* (2013.01)

(58) Field of Classification Search
CPC .......... H04N 1/00007; H04N 1/00015; H04N 1/00074; H04N 1/00681; H04N 1/00684; H04N 1/00687; H04N 1/00689; H04N 1/00692; H04N 1/00694; H04N 1/00708; H04N 1/0071; H04N 1/00713; H04N 1/00716; H04N 1/00724; H04N 1/00726; H04N 1/00729; H04N 1/00742; H04N 1/00763; H04N 1/00766; H04N 1/00771; H04N 1/00774; H04N 1/00779; H04N 1/00782
USPC .......... 358/1.9, 2.1, 468, 448–449, 488, 498, 358/296, 400–401, 403
See application file for complete search history.

(56) References Cited

U.S. PATENT DOCUMENTS

| | | | |
|---|---|---|---|
| 2004/0047643 A1* | 3/2004 | Jackelen et al. | 399/81 |
| 2004/0156061 A1* | 8/2004 | Kobayashi | 358/1.12 |
| 2010/0060909 A1* | 3/2010 | Conescu et al. | 358/1.9 |
| 2011/0131436 A1* | 6/2011 | Ogashiwa | 713/323 |

FOREIGN PATENT DOCUMENTS

| | | | |
|---|---|---|---|
| JP | 2003341187 A | * | 12/2003 |
| JP | 2010-49167 A | | 3/2010 |
| JP | 2010201704 A | * | 9/2010 |
| JP | 2010-284919 A | | 12/2010 |

* cited by examiner

*Primary Examiner* — Thomas D Lee
*Assistant Examiner* — Stephen M Brinich
(74) *Attorney, Agent, or Firm* — Canon USA, Inc. IP Division

(57) ABSTRACT

A control apparatus includes a display unit, a storing unit, a determining unit, and a notification unit. The display unit displays jobs. The storing unit stores attribute information of a sheet to be stored in sheet holding units. The determining unit determines, from among the jobs displayable on the display unit, a job where attribute information of a sheet to be used by the job does not correspond to the sheet attribute information stored in the storing unit. The notification unit notifies a user of the number of jobs determined by the determining unit.

12 Claims, 28 Drawing Sheets

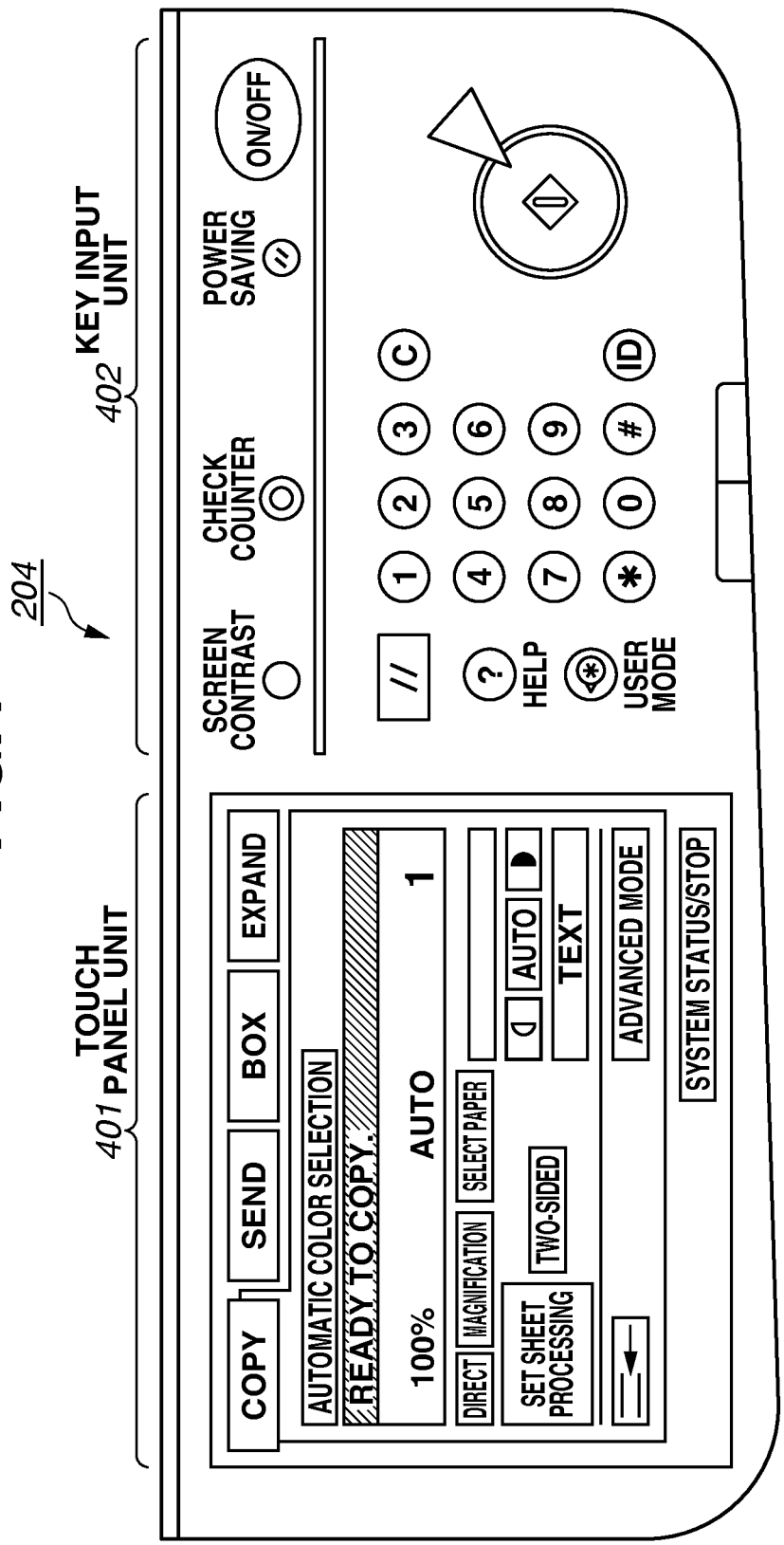

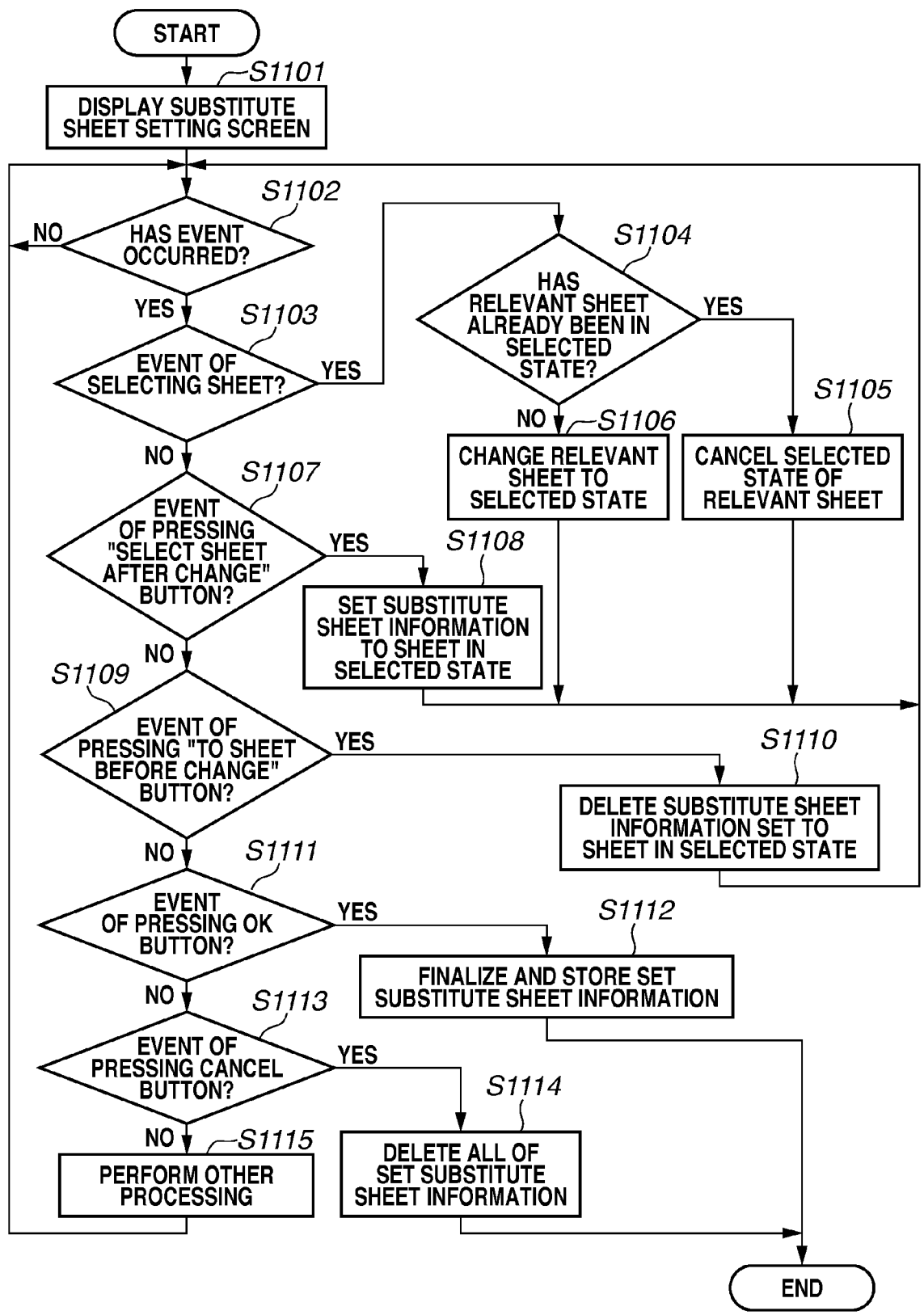

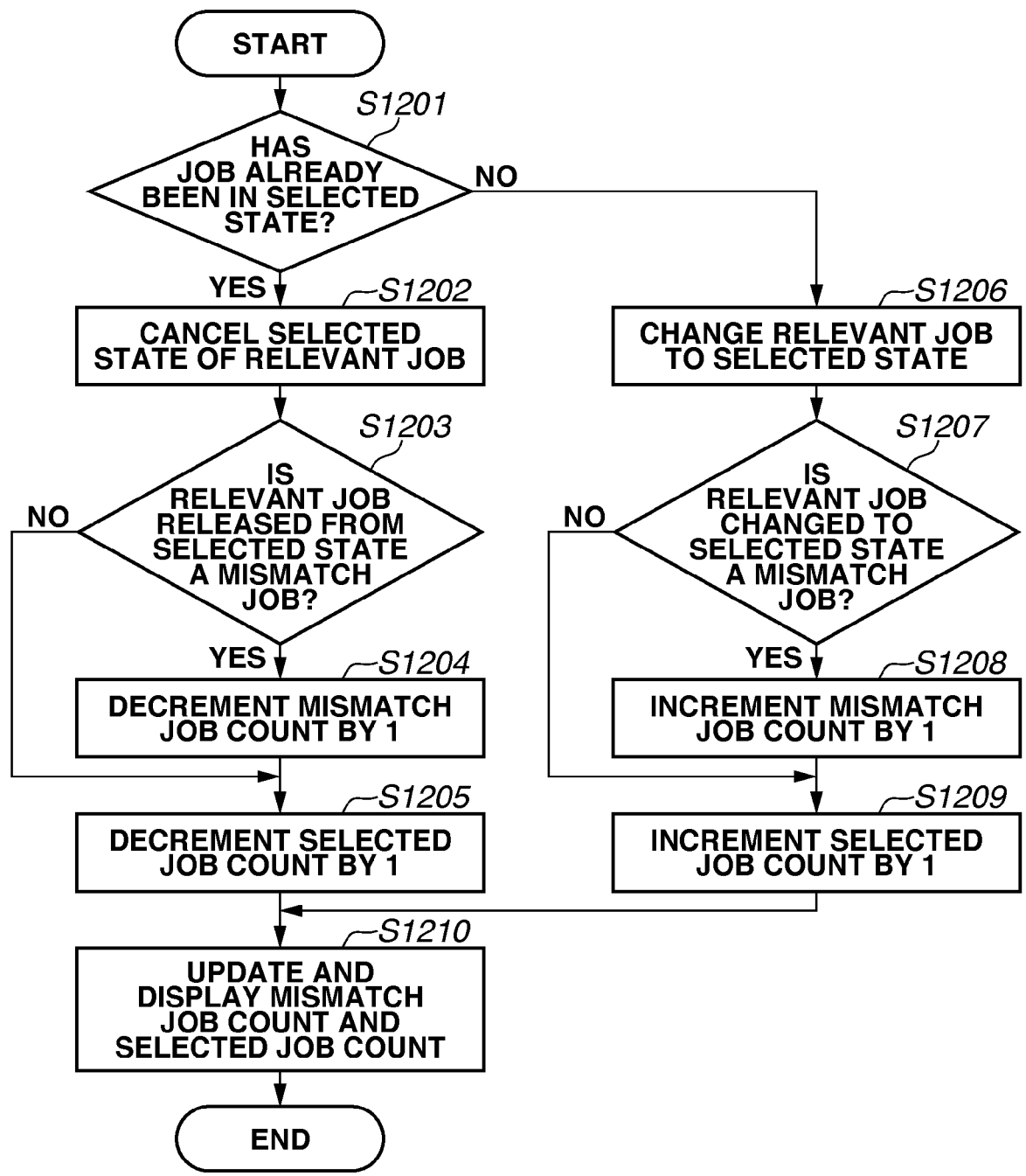

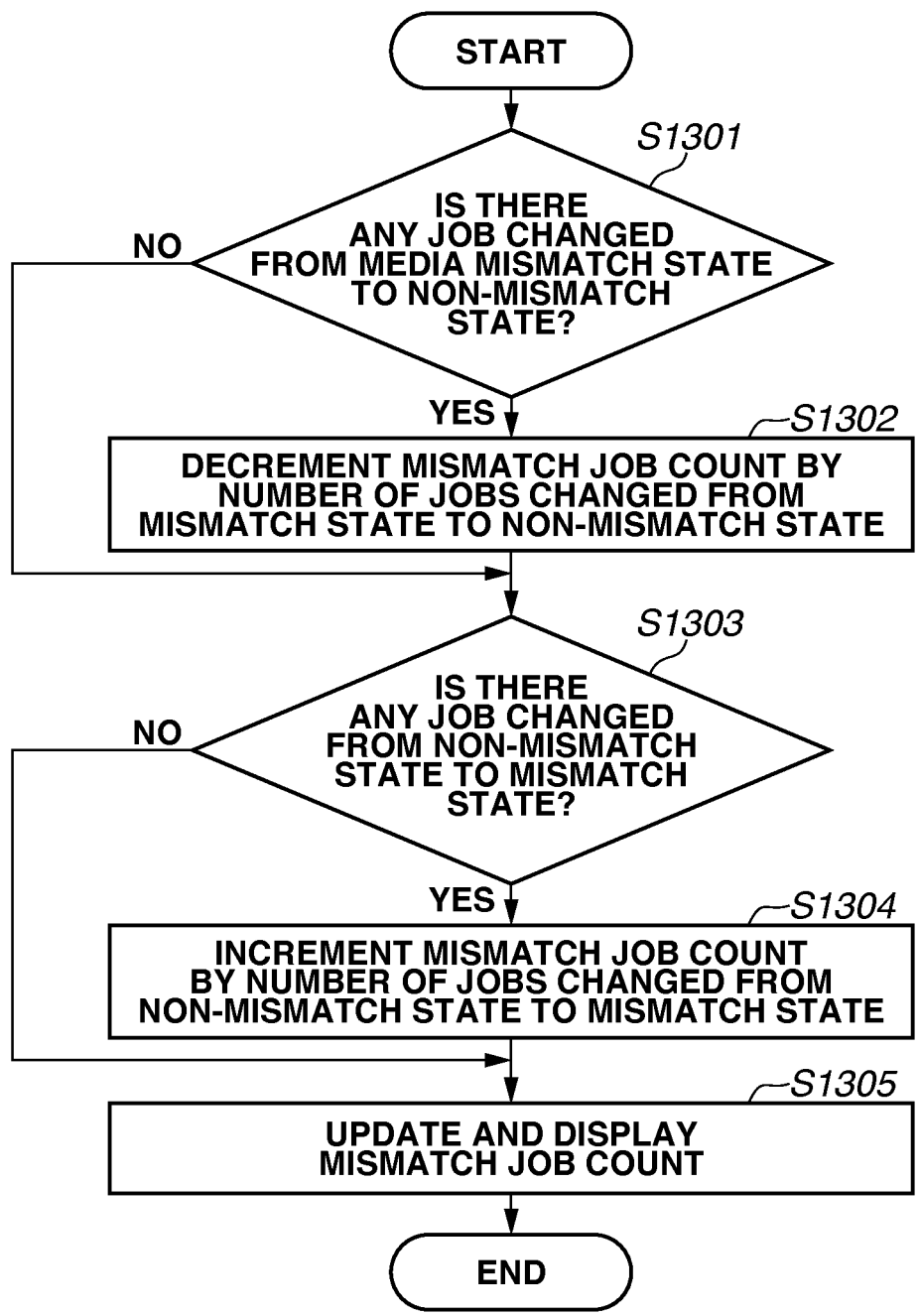

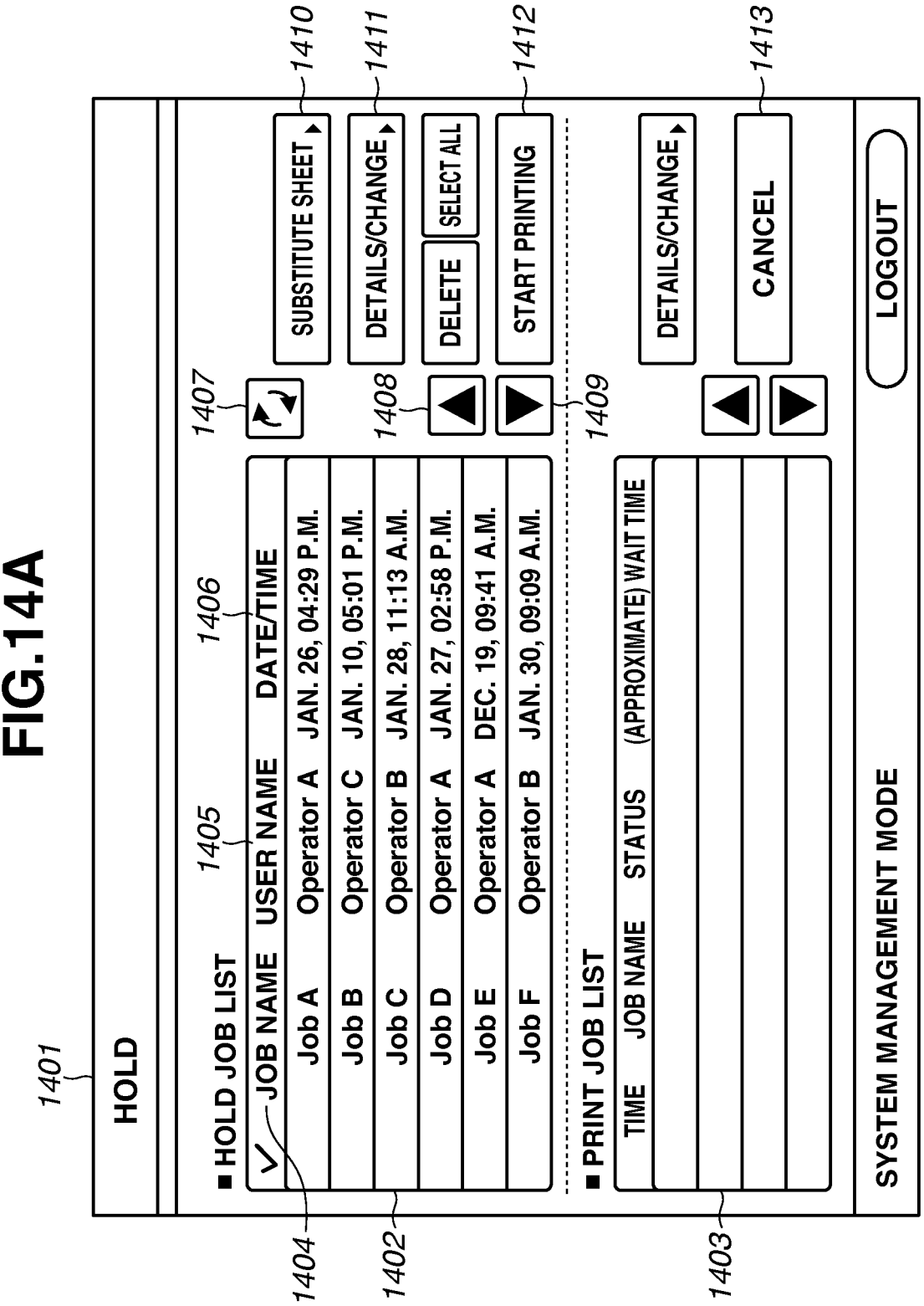

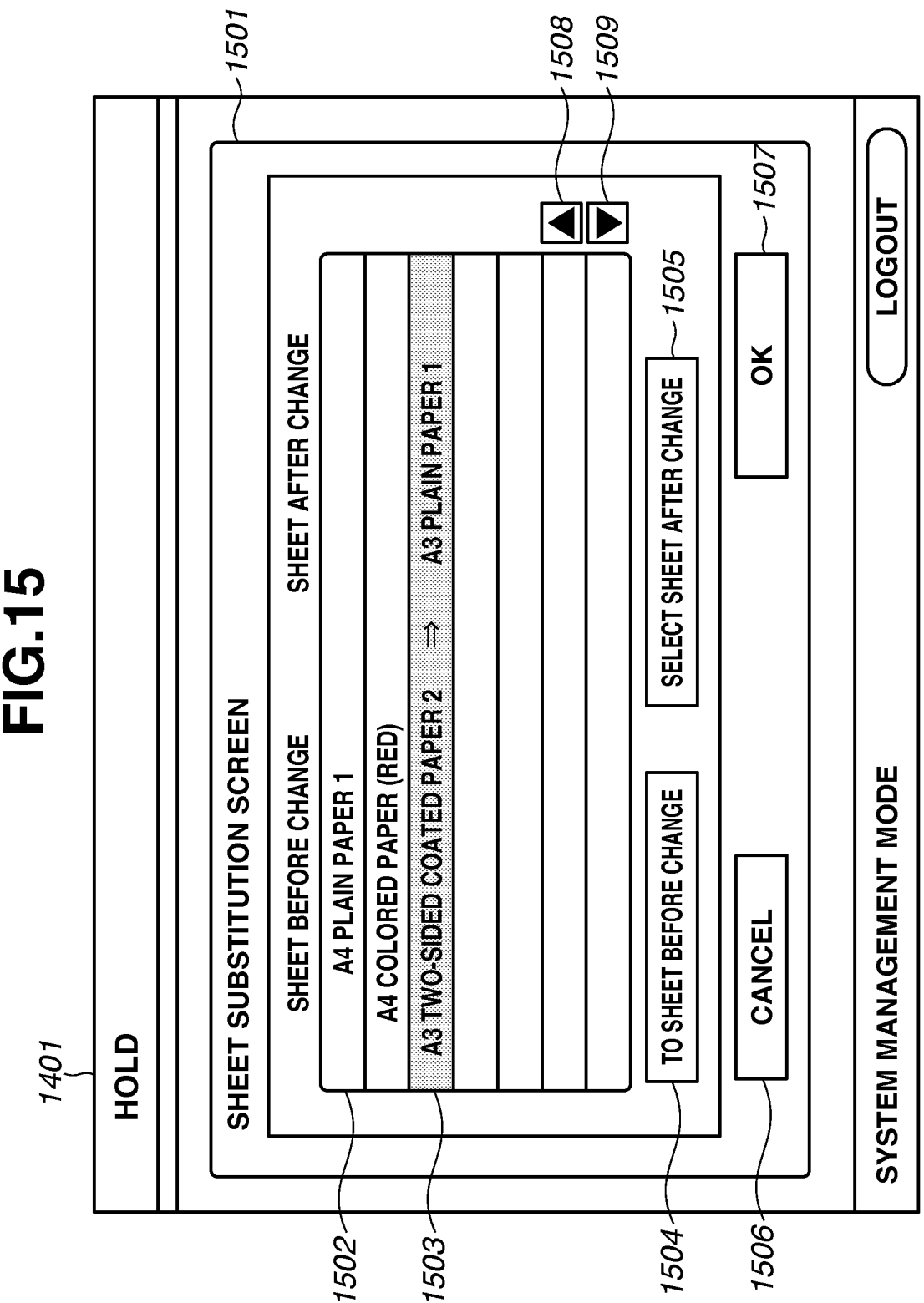

FIG.16

| SHEET HOLDING UNIT ID (1611) | SIZE (1612) | MEDIA TYPE (1613) | REMAINING SHEET AMOUNT (1614) |
|---|---|---|---|
| 1 | A4 | PLAIN PAPER 1 | 3 |
| 2 | A4 | COLORED PAPER (RED) | 1 |
| 3 | A3 | PLAIN PAPER 1 | 2 |
| 4 | B4 | PLAIN PAPER 1 | 0 |
| 5 | B5 | PLAIN PAPER 1 | 3 |
| 6 | A4 | INDEX PAPER | 3 |
| 7 | LTR | PLAIN PAPER 1 | 1 |
| 8 | A4 | TWO-SIDED COATED PAPER 1 | 1 |
| 9 | 11 × 17 | PLAIN PAPER 1 | 0 |
| 10 | A3 | THICK PAPER 2 | 0 |

FIG.17

Job A

| | SIZE | MEDIA TYPE |
|---|---|---|
| 1701 | | |
| 1704 | A4 | PLAIN PAPER 1 |
| 1705 | A4 | TWO-SIDED COATED PAPER 1 |

Job D

| | SIZE | MEDIA TYPE |
|---|---|---|
| 1702 | | |
| 1706 | LTR | PLAIN PAPER 1 |
| 1707 | 11 × 17 | PLAIN PAPER 1 |

Job E

| | SIZE | MEDIA TYPE |
|---|---|---|
| 1703 | | |
| 1708 | A4 | PLAIN PAPER 1 |
| 1709 | A4 | COLORED PAPER (RED) |
| 1710 | A3 | TWO-SIDED COATED PAPER 2 |

FIG.21

*1401* HOLD

■ HOLD JOB LIST    MISMATCH OCCURRENCE COUNT: 5/25    *1433 1434 2101*    *1407*

| | JOB NAME | USER NAME | DATE/TIME | | |
|---|---|---|---|---|---|
| 15 ✓ | Job O | Operator A | JAN. 23, 01:13 P.M. | | ▲ SUBSTITUTE SHEET ▲ |
| 16 ✓ | Job P | Operator A | JAN. 11, 01:09 P.M. ▤ | *1432* | ▲ DETAILS/CHANGE ▲ |
| 17 ✓ | Job Q | Operator A | JAN. 29, 09:53 A.M. | *1408* ◀ ▶ | DELETE  SELECT ALL |
| 18 ✓ | Job R | Operator A | DEC. 21, 11:59 A.M. | | START PRINTING |
| 19 ✓ | Job S | Operator A | JAN. 07, 10:36 A.M. ❗ | *1409* | |
| 20 ✓ | Job T | Operator A | JAN. 05, 02:45 P.M. | *2102 1431* | |

■ PRINT JOB LIST

| TIME | JOB NAME | STATUS | (APPROXIMATE) WAIT TIME |
|---|---|---|---|
| | | | |
| | | | |
| | | | |

◀ ▶  DETAILS/CHANGE ▲

CANCEL

SYSTEM MANAGEMENT MODE    LOGOUT

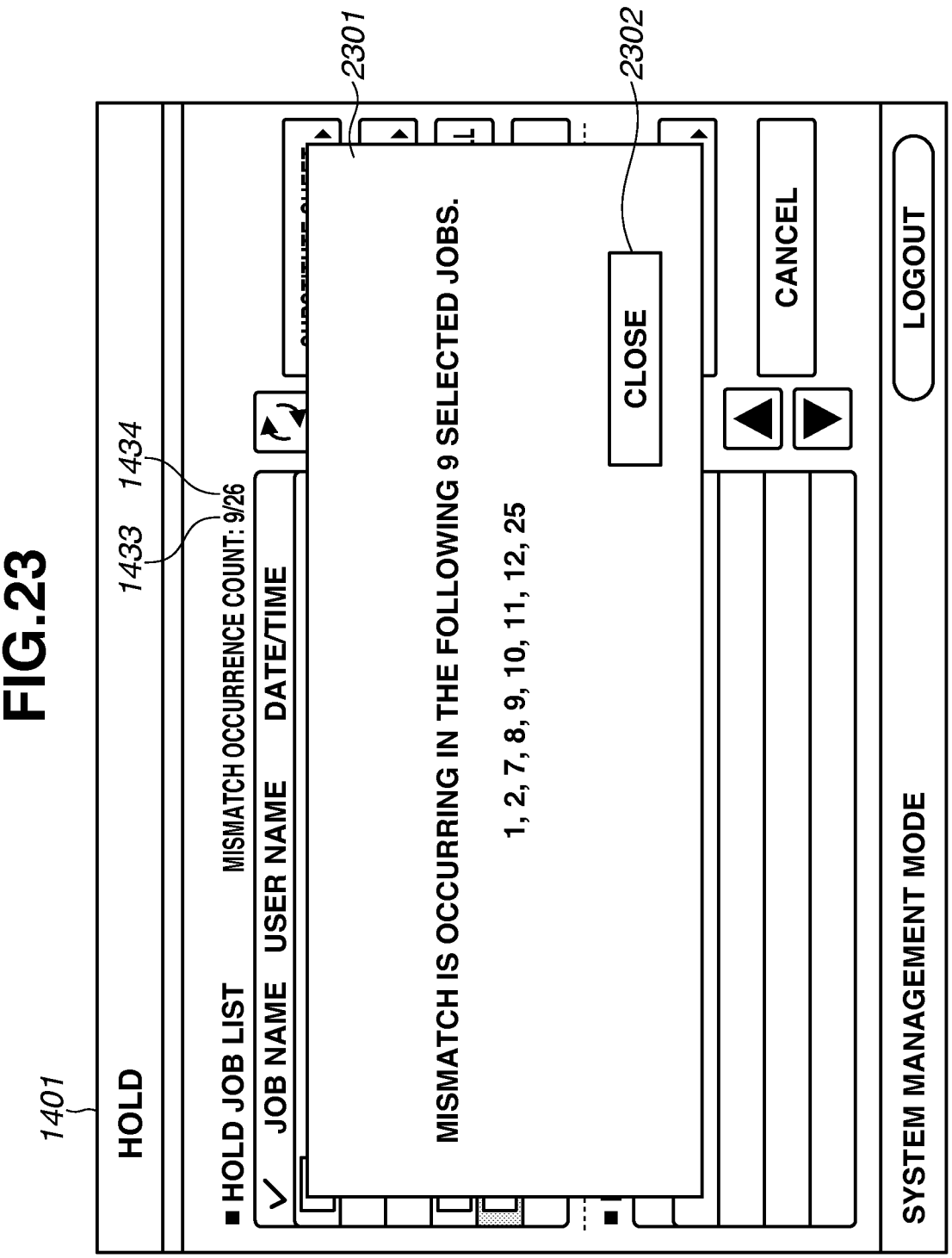

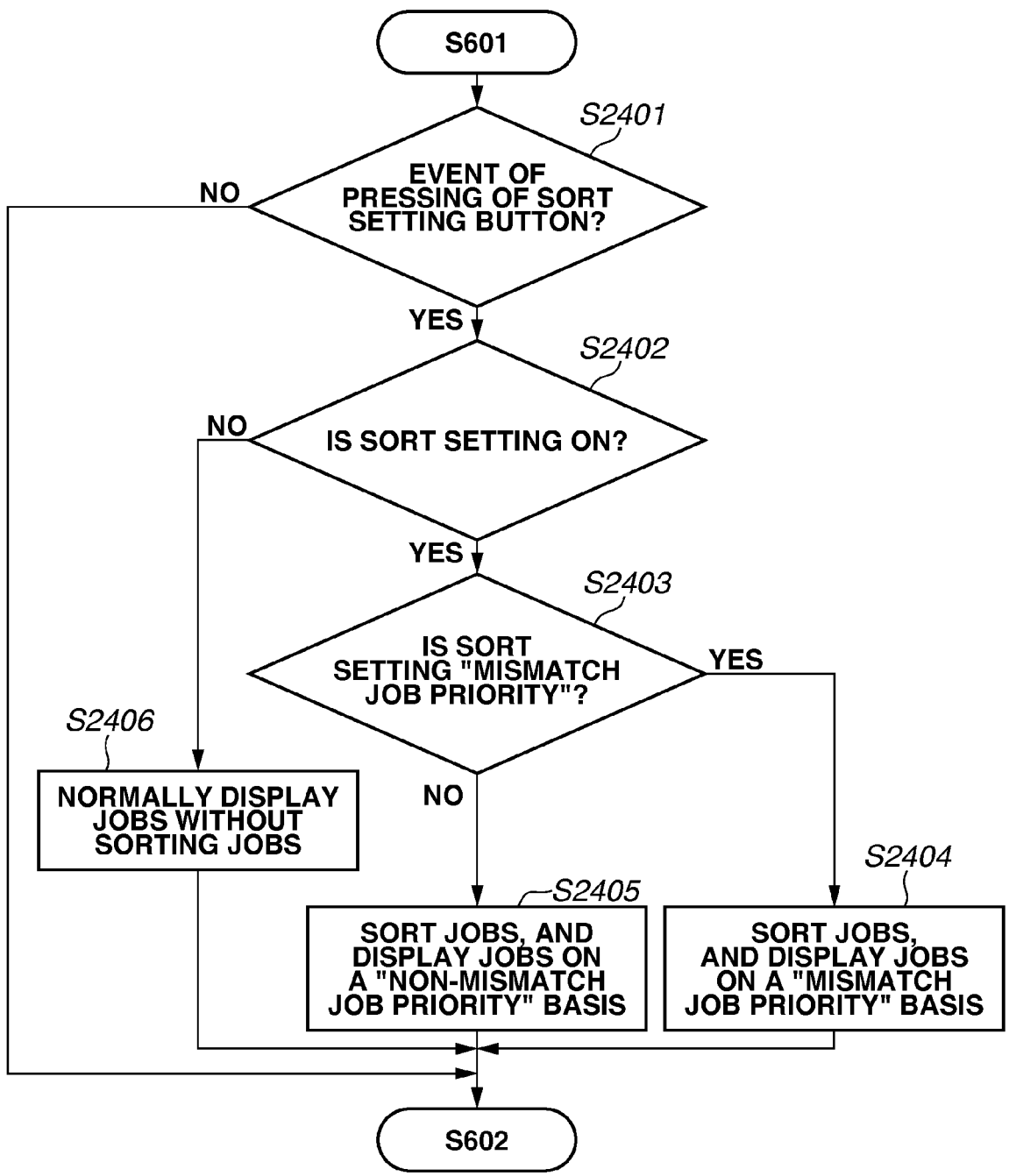

FIG.25

HOLD — 1401

■ HOLD JOB LIST — 2501 MISMATCH JOB PRIORITY

MISMATCH OCCURRENCE COUNT: 5/15 — 1433 1434 1407

| | JOB NAME | USER NAME | | DATE/TIME | |
|---|---|---|---|---|---|
| ✓ | | | | | ↻ |
| 1 ✓ | Job E | Operator A | ! | DEC. 19, 09:41 A.M. | |
| 11 ✓ | Job K | Operator B | ! | JAN. 07, 02:36 P.M. | SUBSTITUTE SHEET ▲ |
| 8 ✓ | Job H | Operator C | ! | JAN. 22, 08:59 A.M. | |
| 2 ✓ | Job D | Operator A | ☰ | JAN. 27, 02:58 P.M. | DETAILS/CHANGE ▲ |
| 13 ✓ | Job M | Operator A | ☰ | DEC. 27, 06:07 P.M. | DELETE | SELECT ALL |
| 9 ✓ | Job I | Operator C | | DEC. 18, 10:08 A.M. | START PRINTING |

1431 — 1432 1409 — ◀ ▶ — 1408

■ PRINT JOB LIST

| TIME | JOB NAME | STATUS | (APPROXIMATE) WAIT TIME |
|---|---|---|---|
| | | | |
| | | | |
| | | | |

DETAILS/CHANGE ▲

CANCEL

◀ ▶

SYSTEM MANAGEMENT MODE

LOGOUT

CONTROL APPARATUS, CONTROL METHOD, AND STORAGE MEDIUM

BACKGROUND OF THE INVENTION

1. Field of the Invention

The present invention relates to a control apparatus capable of storing a job and executing the stored job, a control method, and a storage medium.

2. Description of the Related Art

Conventionally, in a printing apparatus provided with a plurality of sheet holding units, a known technique notifies a user by using an operation screen of the fact that attribute information of a certain sheet type to be used by a job (for example, the sheet size) is not registered in any sheet holding unit (refer to Japanese Patent Application Laid-Open No. 2010-284919). Another known technique notifies a user by using a job status list screen of either the fact that the size of a certain sheet type to be used by a job is not registered in any sheet holding unit or the fact that there is no remaining sheets of a certain sheet type to be used by a job, (refer to Japanese Patent Application Laid-Open No. 2010-49167).

However, when the number of jobs which should be displayed on the operation screen of the printing apparatus increases, not all of the jobs may be displayed on the operation screen at one time. There is a case where, unless the user operates the operation screen, for example, by using scroll buttons, the user is unable to confirm on the operation screen the fact that the size of a certain sheet type to be used by a job is not registered in any sheet holding unit.

SUMMARY OF THE INVENTION

According to an aspect of the present invention, a control apparatus includes a display unit configured to display jobs, a storing unit configured to store attribute information of a sheet to be stored in sheet holding units, a determining unit configured to determine, from among the jobs displayable on the display unit, a job where attribute information of a sheet to be used by the job does not correspond to the sheet attribute information stored in the storing unit, and a notification unit configured to notify a user of the number of jobs determined by the determining unit.

When the number of jobs which should be displayed on an operation screen increases, the jobs may not be displayed on the operation screen at one time. A control apparatus determines a job, attribute information of a sheet to be used by the job not corresponding to the sheet attribute information stored in the storage unit, from among the jobs displayable on the display unit, and notifies a user of the number of determined jobs. Further features of the present invention will become apparent from the following description of exemplary embodiments with reference to the attached drawings.

BRIEF DESCRIPTION OF THE DRAWINGS

FIG. 4 is a top view illustrating an operation unit of the digital printer according to the first exemplary embodiment.

FIG. 11 is a flowchart illustrating the sheet substitution processing (in step S1100) shown in FIG. 6, in the digital printer according to the first exemplary embodiment.

FIG. 12 is a flowchart illustrating the mismatch job count and selected job count update and notification (in step S1200) shown in FIG. 6 in the digital printer according to the first exemplary embodiment.

FIG. 13 is a flowchart illustrating the mismatch job count update and notification (in step S1300) shown in FIG. 6, in the digital printer according to the first exemplary embodiment.

FIG. 14A illustrates an example of a job hold function operation screen displayed on the operation unit of the digital printer according to the first exemplary embodiment.

FIG. 15 illustrates an example of a sheet substitution screen displayed on the operation unit of the digital printer according to the first exemplary embodiment.

FIG. 16 illustrates an example of a sheet management table for managing information about sheet types stored in respective sheet holding units of the digital printer according to the first exemplary embodiment.

FIG. 17 illustrates sheet information used by each of Job A, Job D, and Job E illustrated in FIG. 14A.

FIG. 21 illustrates an example of a job hold function operation screen displayed on the operation unit of the digital printer according to the third exemplary embodiment.

FIG. 23 illustrates an example of a job hold function operation screen displayed on the operation unit of the digital printer according to the fourth exemplary embodiment.

FIG. 24 is a flowchart illustrating processing for sorting and displaying jobs on a priority basis according to the result of the media mismatch determination, in a digital printer according to a fifth exemplary embodiment.

FIG. 25 illustrates an example of a job hold function operation screen displayed on the operation unit of the digital printer according to the fifth exemplary embodiment.

DESCRIPTION OF THE EMBODIMENTS

Figure 1:
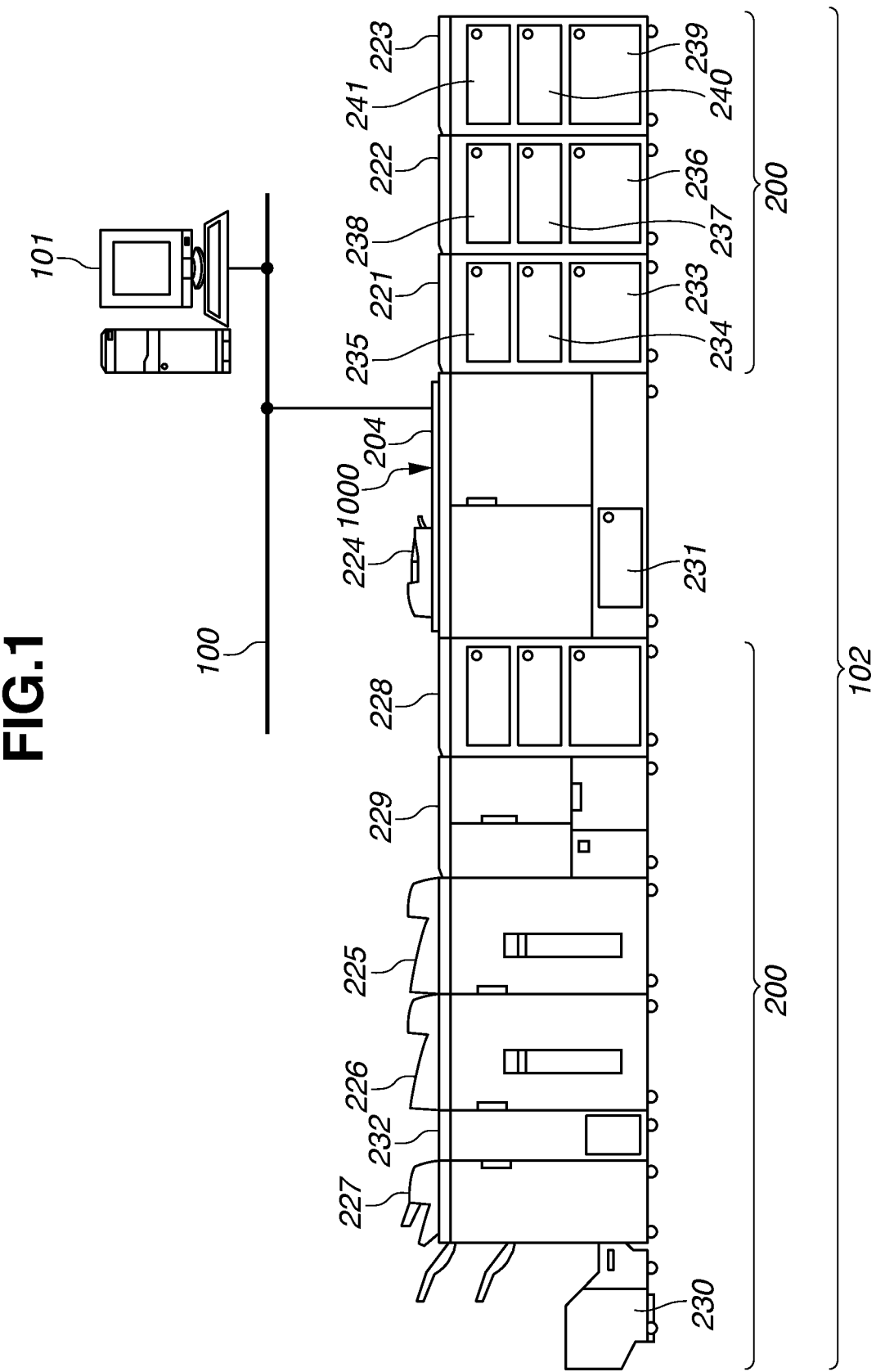
FIG. 1 describes a digital printing system according to a first exemplary embodiment of the present invention.

Various exemplary embodiments, features, and aspects of the invention will be described in detail below with reference to the drawings.

The following exemplary embodiments do not limit the present invention within the ambit of the appended claims. Not all of the combinations of the features described in the present exemplary embodiment are indispensable to the solutions for the present invention.

A digital printing system according to a first exemplary embodiment of the present invention will be described below with reference to FIG. 1. In this printing system, a digital printer (printing apparatus) 102 and a computer 101 are connected with each other via a network 100.

The digital printer 102 includes a plurality of interconnected apparatuses having different roles to achieve complicated sheet processing.

The digital printer 102 can be roughly divided into three portions with a printer unit 1000 in the middle. Referring to FIG. 1, apparatuses arranged on the right-hand side of the printer unit 1000 are referred to as sheet feeding apparatuses for successively feeding internally stored sheets to the printer unit 1000 at appropriate timing as a main role. The relevant apparatuses also detect the remaining amount of internally stored sheets with sensors (not illustrated). Sheet holding units 231 included in the printer unit 1000 are able to perform equivalent functions to those of the sheet feeding apparatuses. These sheet holding units 231 provided in the printer unit 1000 are also referred to as sheet feeding apparatuses in the following descriptions. Each unit constituting the digital printer 102 will be described below.

The printer unit 1000 forms (prints) an image by applying toner onto a recording medium (sheet) fed from a sheet holding unit 231, based on image data. The configuration and operating principle of the printer unit 1000 are as follows.

A beam of light, such as a laser beam, modulated according to image data is reflected by a rotating polygon mirror, and radiated onto a photosensitive drum as scanning light. An electrostatic latent image formed on the photosensitive drum by the laser beam is developed by toner. A toner image formed on a transfer drum is transferred onto a sheet pressed onto the transfer drum. A series of the above-described image forming process is performed sequentially on yellow (Y), magenta (M), cyan (C), and black (K) toner to form a full color image on the sheet. In addition to these four colors, toner of other special colors and transparent toner may be transferred. The sheet on the transfer drum, with the full color image formed thereon in this way, is conveyed to a fixing unit. The fixing unit includes a roller, a belt, and a heat source, such as a halogen heater, in the roller. The fixing unit dissolves toner of the toner image (transferred onto the sheet) with heat and pressure to fix it onto the sheet. Although the following describes the electrophotographic process, the printing process is not limited thereto. Any types of printers, such as an ink-jet printer and a thermal transfer type printer, may be used.

The printer unit 1000 of the digital printer 102 according to the first exemplary embodiment includes a scanner (not illustrated) and an operation unit 204 (FIG. 4) arranged at the top face of the printer unit 1000. Since the operation unit 204 is arranged at the top face of the printer unit 1000, it is not illustrated in detail in FIG. 1. The operation unit 204 provides the user with various interfaces for performing various settings and operations for the printer unit 1000 according to the first exemplary embodiment. A document feeder and the scanner 224 are provided on the upper part of the printer unit 1000.

The digital printer 102 is configured so that various accompanying apparatuses as well as the printer unit 1000 can be attached thereto.

Large-capacity sheet feeding apparatuses 221, 222, and 223 are detachably attached in a direct or indirect way to the printer unit 1000, and include a plurality of sheet holding units 233 to 241. Each of the sheet holding units 233 to 241 includes a sensor for detecting the remaining amount of sheets stored therein. This configuration enables the printer unit 1000 to perform print processing on a large volume of sheets. Although, in the present exemplary embodiment, the three large-capacity sheet feeding apparatuses 221, 222, and 223 are connected, the configuration is not limited thereto, and only one large-capacity sheet feeding apparatus 221 may also be connected. The plurality of sheet holding units may be a paper feed tray or a manual feed tray, both of which may also be provided together.

Large-capacity stackers 225 and 226 are apparatuses for stocking printed sheets. The system having the above-described large-capacity sheet feeding apparatuses requires such large-capacity stackers since the system generates a large volume of print products. The number of large-capacity stackers and the number of large-capacity sheet feeding apparatuses are not limited to the configuration illustrated in FIG. 1. Although, in this example, two large-capacity stackers 225 and 226 are connected, the configuration is not limited thereto, and only one large-capacity stacker 225 may also be connected.

In the large-capacity stackers 225 and 226, the door for taking out sheets loaded on the internal loading tray can be opened by a user operation. The door can also be automatically opened by an instruction from the printer unit 1000. When door open processing is performed, processing for loading printed sheets on the large-capacity stackers 225 and 226 is controlled to stop in advance.

Further, the large-capacity stackers 225 and 226 are provided with a shift discharge function for shifting the loading position of any sheet when loading printed sheets. This enables sorting a large volume of loaded sheets in units of a certain bundle.

A folding machine 232 is used to perform various folding processing, such as fold in the middle, Z-fold, fold in three, and fold in four.

A saddle stitch bookbinding machine 227 includes various units for enabling performing stapling processing and processing for generating a bookbound product (saddle stitch, saddle fold, punching, shift discharge processing, etc.) on sheets printed by the printer unit 1000. When generating a saddle stitch bookbound product by using the saddle stitch bookbinding machine 227, the digital printer 102 according to the first exemplary embodiment forms an output product by combining the saddle fold function and the saddle stitch function provided by the saddle stitch bookbinding machine 227 without using the folding function of the folding machine 232.

A cutting machine 230 conveys the bookbound product saddle-stitched by the saddle stitch bookbinding machine 227, and cuts the portion corresponding to the front edge to form a front edge on the flat surface.

An inserter 228 inserts, at suitable timing based on settings, a sheet held by the inserter 228 into sheets sent from the printer unit 1000. This inserter 228 enables inserting a sheet not requiring printing, between printed sheets. Similar to the large-capacity sheet feeding apparatuses 221, 222, and 223, the inserter 228 includes a plurality of large-capacity sheet feeding portions applicable to large-capacity print processing.

A case bookbinding machine 229 performs front cover gluing processing on a sheet bundle printed by the printer unit 1000 or discharged from the inserter 228 to form a case-bookbound product. Further, top-gluing bookbinding processing which is gluing bookbinding processing without attaching a cover can also be executed by the case bookbinding machine 229.

The folding machine 232, the saddle stitch bookbinding machine 227, the cutting machine 230, the inserter 228, and the case bookbinding machine 229 may or may not be included in the digital printer 102.

Referring to FIG. 1, apparatuses including the large-capacity stackers 225 and 226 for loading sheets, arranged on the left-hand side of the printer unit 1000, is referred to as sheet process apparatus. The sheet process apparatus is also referred to as sheet processing apparatus or post-processing apparatus. The sheet process apparatus applies various processes to sheets that have undergone print processing, or is configured to stack sheets. Hereinafter, the above-described sheet feeding apparatuses and sheet process apparatus are collectively referred to as sheet processing apparatuses 200.

Figure 2:
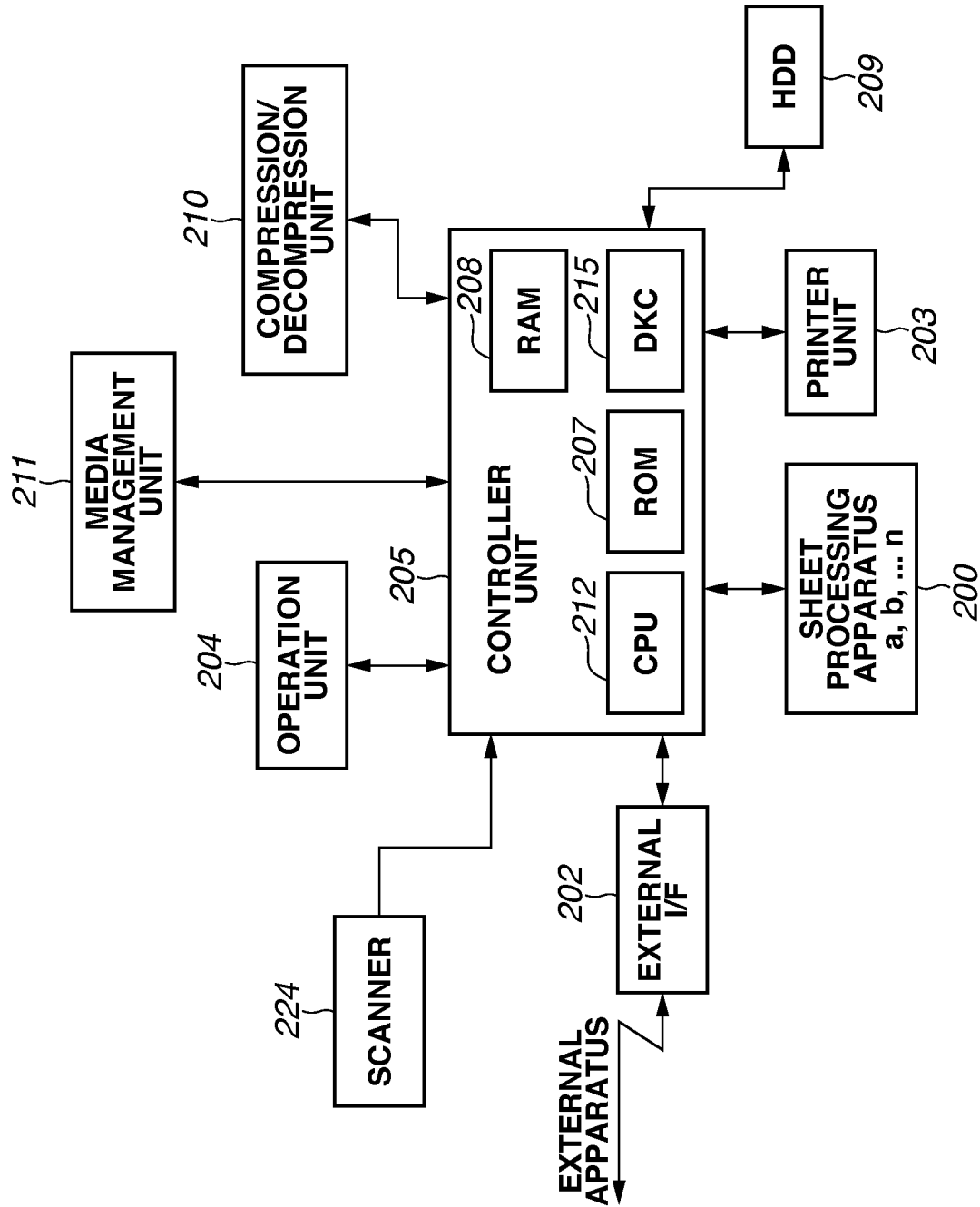
FIG. 2 is a functional block diagram illustrating a functional configuration of the digital printer according to the first exemplary embodiment.

A circuit configuration of the digital printer 102 according to the first exemplary embodiment will be described below with reference to the functional block diagram illustrated in FIG. 2. The sheet processing apparatuses 200 including the above-described various sheet feeding apparatuses and the sheet process apparatus are configured as illustrated in FIG. 2.

The digital printer 102 includes a nonvolatile memory, such as a hard disk drive (HDD) 209 which is capable of storing in the apparatus a plurality of jobs subjected to processing. Although, in the first exemplary embodiment, the digital printer 102 uses a hard disk drive as a nonvolatile memory, the configuration is not limited to the hard disk drive as long as the nonvolatile memory is a similar large-capacity nonvolatile storage device. The nonvolatile memory may be a solid state drive (SSD) instead of the HDD 209.

The digital printer 102 is provided with a copy function for storing data received from the scanner in the HDD 209, reading the data from the HDD 209, and printing it with a printer unit 203. The digital printer 102 is provided with a print function for storing in the HDD 209 a job received from an external apparatus via an external I/F 202 as an example communication unit, reading the job from the HDD 209, and printing it with the printer unit 203. The digital printer 102 is a multifunctional processing apparatus (MFP) (also referred to as image forming apparatus) having such a plurality of functions. The digital printer 102 is preferably capable of performing either color or monochrome printing.

The scanner reads a document image to acquire image data, performs image processing on the acquired image data, and outputs the resultant image data. The external I/F 202 transmits and receives image data to/from an external apparatus.

The external apparatus is, for example, a facsimile device, a network connection device, or an external dedicated apparatus. The HDD 209 also stores various management information which is permanently stored, changed, and managed by the digital printer 102. The digital printer 102 includes a printer unit 203 for performing print processing on a printing target job stored in the HDD 209. The digital printer 102 also includes the operation unit 204 having a display, as an example of a user interface unit. A controller unit (control unit) 205 of the digital printer 102 includes a central processing unit (CPU) 212 to control processing and operations of various units included in the digital printer 102. The controller unit (control unit) 205 includes a read only memory (ROM) 207 and a random access memory (RAM) 208. The ROM 207 and the RAM 208 store various control programs to be executed by the CPU 212 to implement various processing of flowcharts (described below). The ROM 207 also stores a display control program for presenting various user interface (UI) screens on the display of the operation unit 204 including user interface screens (hereinafter referred to as UI screens).

The CPU 212 of the controller unit 205 reads and executes a program stored in the ROM 207 to cause the digital printer 102 to perform various operations according to the first exemplary embodiment. The ROM 207 also stores a program for causing the CPU 212 to execute processing for interpreting page description language (PDL) data received from the external apparatus via the external I/F 202, and rasterizing the PDL data into raster image data (bit map image data). Likewise, the ROM 207 also stores a program for causing the CPU 212 to interpret and process a print job received from an external apparatus via the external I/F 202. These pieces of processing are executed by software. The ROM 207 is a read only memory for prestoring programs, such as the boot sequence and font information. Various programs stored in the ROM 207 will be described in detail below. The RAM 208 is a readable and writable memory for storing image data sent from the scanner and the external I/F 202, various programs, and setting information.

The HDD 209 prestores various programs (described below) and image data compressed by a compression/decompression unit 210. This HDD 209 is configured to store a plurality of data items, such as print data of a processing target job. The controller unit 205 stores in the HDD 209 a processing target job input via various input units, such as the scanner and the external I/F 202, reads the job from the HDD 209, and outputs it to the printer unit 203 for printing. The controller unit 205 also performs control to transmit the job read from the HDD 209 to an external apparatus via the external I/F 202. Thus, the controller unit 205 performs various output processing for a processing target job stored in the HDD 209. Although, in the above-described example, the HDD 209 is used, a volatile RAM may also be used. The compression/decompression unit 210 compresses and decompresses image data stored in the RAM 208 and the HDD 209 based on various compression techniques, such as JBIG and JPEG.

A disc controller (DKC) 215 of the controller unit 205 controls access to the HDD 209.

The controller unit 205 also controls operations of the sheet processing apparatuses 200. The sheet processing apparatuses 200 refer to the feed system apparatuses and the sheet process apparatus described with reference to FIG. 1. A media management unit 211 is a module for managing information about sheet types processable by the digital printer 102. The information about sheet types processable by the digital printer 102 is stored in the HDD 209.

The computer 101 is a general purpose computer connected with the digital printer 102 via a network 100. The computer 101 is capable of executing various application programs and transmitting a print job to the digital printer 102.

The configuration of the personal computer (PC) 101 illustrated in FIG. 1 according to the first exemplary embodiment will be described below with reference to the hardware block diagram illustrated in FIG. 3.

Figure 3:
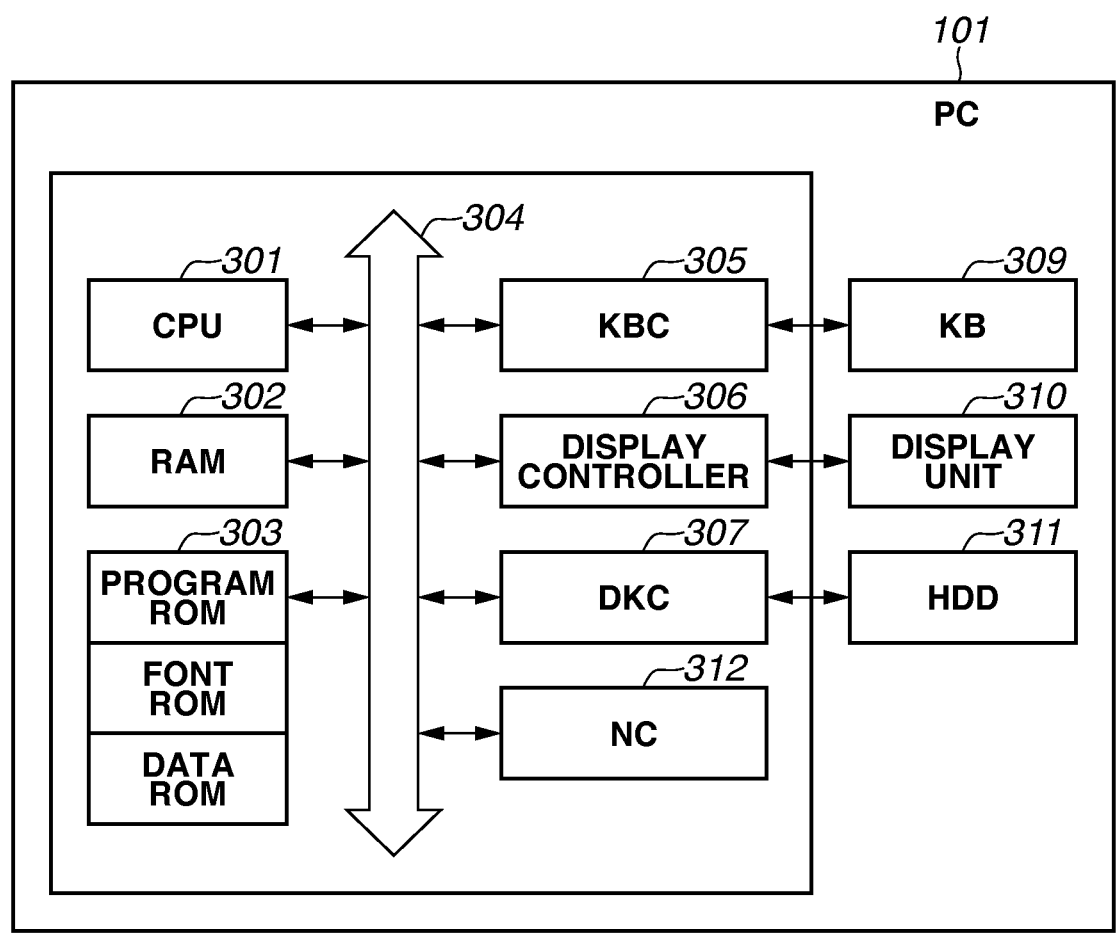
FIG. 3 is a block diagram illustrating a hardware configuration of a personal computer (PC) according to the first exemplary embodiment.

Referring to FIG. 3, the CPU 301 executes program, such as an operating system (OS) stored in a program ROM included in a ROM 303, and a general application and a bookbinding application loaded from the HDD 311 into a RAM 302. The ROM 303 also includes a font ROM and a data ROM. The RAM 302 functions as a main memory of the CPU 301 and a work area. A keyboard controller (KBC) 305 controls inputs from a keyboard 309 and a pointing device (not illustrated). A display controller 306 controls display on a display unit 310. A disc controller (DKC) 307 controls access to the HDD 311 storing the boot program, various applications, font data, and user files. A network controller (NC) 312 is connected to the network 100, and performs processing for controlling communication with other apparatuses connected to the network 100. A bus 304 connects the CPU 301, the RAM 302, the ROM 303, and various controllers, and conveys data signals and control signals.

The operation unit 204 of the digital printer 102 according to the first exemplary embodiment will be described below with reference to the top view illustrated in FIG. 4. In the operation unit 204, a key input unit 402 can receive a user operation by using hard keys. A touch panel unit 401, which is a display unit capable of receiving a user operation by software keys (display keys), displays various operation screens. The operation unit 204 is controlled by the controller unit 205. A screen displayed on the display of the touch panel unit 401 illustrated in FIG. 4 indicates an operation screen displayed under control of the controller unit 205. Items displayed and items operable on the display change according to a user operation performed on this screen or various states of the digital printer 102. For example, when the user operates the touch panel unit 401, a UI function program (described below) identifies the contents of the user operation performed on the touch panel unit 401, and executes processing according to the contents of the identification.

Although, in the above example, the operation unit 204 includes the key input unit 402 and the touch panel unit 401, the configuration is not limited thereto. The operation unit 204 may include only the touch panel parts 401.

Programs to be executed by the digital printer 102 will be described below.

These programs are stored in the HDD 209, and are read and executed by the CPU 212 of the controller unit 205 of the digital printer 102.

A job definition format (JDF) function program is executed by the controller unit 205 to implement a print function when the digital printer 102 receives a JDF job via the external I/F 202.

A page description language (PDL) function program is executed by the controller unit 205 to implement a print function when the digital printer 102 receives PDL data via the external I/F 202.

The user interface (UI) function program controls the operation unit 204. The UI function program identifies the contents of a user operation performed on the operation unit 204 of the digital printer 102, performs suitable screen transition, and requests (instructs) the controller unit 205 to perform processing.

A sheet management program performs a management function related to sheets usable by the digital printer 102. Sheet-related information managed by the sheet management program is stored in the HDD 209. In the present exemplary embodiment, the sheet-related information managed by the sheet management program includes information about the size, the media type, and the remaining amount, of sheets to be stored in each sheet holding unit. In addition to the above-described information, the sheet management information may include, for example, information about the sheet name and the sheet grammage.

A job hold function program is executed by the controller unit 205 when the user of the digital printer 102 instructs to execute a job hold function from the operation unit 204. The job hold function stores printing target data in the HDD 209 of the digital printer 102 until a print instruction is received from the user. Then, when the user selects data to be printed, the function prints the data upon reception of a print instruction. With the job hold function, the controller unit 205 sequentially issues instructions for operations of these devices in a suitable order based on the processing order and processing condition described in the job hold function program, thus performing print processing on a job hold basis. These devices include the printer unit 203, the sheet processing apparatuses 200, the HDD 209, the compression/decompression unit 210, and the RAM 208. It is possible to change settings of the stored job before execution.

When the user stores a print job by using the job hold function of the digital printer 102 from the computer 101 as an external apparatus, the user performs the following procedures. Specifically, the user instructs to store the print job by using the job hold function, instead of executing the PDL function program or the JDF function program to perform print processing on the job. Whether the print processing is instructed by the PDL function program or the JDF function program, or the job is stored by the job hold function, is determined by a designation of a print application operating on the computer 101 into which the user inputs the job. This designation is reflected in the setting attribute of the job subjected to processing by the PDL function program or the JDF function program. Then, the PDL function program or the JDF function program switches the processing based on the relevant setting attribute.

A media mismatch determination function program is executed by the controller unit 205 to perform the following determination when the user of the digital printer 102 instructs to execute the media mismatch determination function from the operation unit 204. In the media mismatch determination, the controller unit 205 determines that the attribute information of a certain sheet type to be used by a print job is not registered in any sheet holding unit, and that there is no remaining amount of sheets of a certain sheet type to be used by the print job. The controller unit 205 reads the attribute information of sheet types usable by the digital printer 102 stored in the HDD 209 of the digital printer 102 by using the sheet management program. Then, the controller unit 205 compares the relevant attribute information with the attribute information of the sheet type to be used by the job held by the job hold function program to determine whether the attribute information of the sheet type to be used by the print job is registered in any one of the sheet holding units. Then, the controller unit 205 detects the remaining amount of sheets with a sensor provided in the relevant sheet holding unit, and determines whether there is a remaining amount of sheets of the sheet type to be used by the print job. The result of the media mismatch determination performed by the media mismatch determination function program is held by a flag, and is stored in the RAM 208.

The attribute information of the sheet type to be used by the print job includes at least one of the sheet size, the sheet grammage, the sheet surface property, the sheet shape, and the sheet color.

Although some of function programs have been described in detail above, not all of function programs needs to be prepared, and some of function programs or function programs other than the above-described ones may be provided.

Figure 5A:
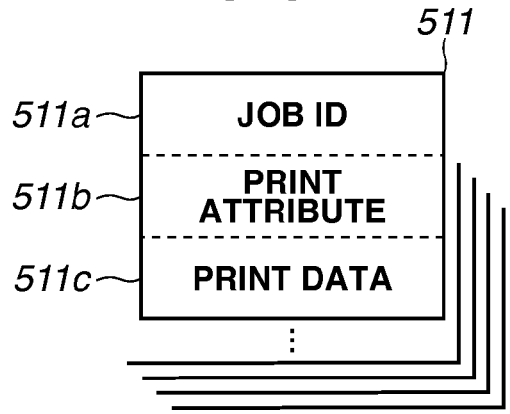
FIG. 5A illustrates the contents of data related to entries according to the first exemplary embodiment.

Data structures of a job, print queue data, and hold queue data of the digital printer 102 according to the first exemplary embodiment will be described below with reference to FIGS. 5A, 5B, and 5C.

The data structure of a job will be described below with reference to FIG. 5A. Each job input into the digital printer 102 has a structure of an entry 511 as illustrated in FIG. 5A. A number of existing entries 511 is identical with a number of jobs input into and processed by the digital printer 102. The entry 511 includes a job identifier (ID) 511a, a print attribute 511b, and print data 511c. The job ID 511a in the entry 511 is a unique ID, and is used by the digital printer 102 to identify a job. The print attribute 511b in the entry 511 stores print attribute defined by the job. The print attribute describes, for example, the name of a user who input the job, the size of sheet to be fed, the medium type, and the number of pages. The print data 511c in the entry 511 stores print data which describes an image to be drawn on a print sheet.

The data structure of the print queue data will be described below with reference to FIG. 5B. When a job is input into the print queue, the job is managed by a print queue buffer 521. When a job is input into the print queue in a state where there is no job therein, the job is registered in a queue 1 of the print queue buffer 521. When the next job is input, the job is registered in a queue 2 so as to be stacked in the print queue buffer 521. Basically, the registered jobs are sequentially processed for printing from the one stacked in the queue 1. Upon completion of printing for the job in the queue 1, the job is deleted from the print queue buffer 521, and the job in the queue 2 of the print queue buffer 521 is shifted to the queue 1. Then, the job stacked in the queue 1 is processed for printing. Although FIG. 5B illustrates only five queues, a suitable number of queues is provided in consideration of the memory capacity and the print processing speed of the digital printer 102.

The attribute of a job registered in each print queue is managed by a print queue job attribute table. Referring to FIG. 5B, a print queue job attribute table 522 corresponding to a job is registered in the queue 1, and a print queue job attribute table 523 corresponding to a job is registered in the queue 5. Actually, a number of the existing tables is identical with a number of queues of the print queue buffer 521. The print queue job attribute table 522 will be described in detail below.

The print queue job attribute table 522 includes a job ID 522a for identifying a job, a flag 522b for identifying the result of the media mismatch determination, and a flag 522c for identifying whether the job is a suspend processing target. The media mismatch determination will be described in detail below with reference to FIG. 7. The print queue job attribute table 522 does not include the entity of the job. Although, in the present exemplary embodiment, the print queue job attribute table 522 does not include the entity of the job, it may include the entity of the job, for example, as a result of copy. The CPU 212 searches for the job ID 511a having the same value as the job ID 522a among a plurality of entries 511. Then, the CPU 212 acquires the print attribute 511b and the print data 511c of an entry 511 identified from the job ID 511a having the same value as the job ID 522a.

The data structure of the hold queue data will be described below with reference to FIG. 5C. When a printing execution instruction for the print data managed by a hold queue buffer 531 is issued, the relevant print data is moved to the print queue buffer 521. When a job is input into a hold queue, the job is entered in the hold queue buffer 531. The hold queue buffer 531 is an area for storing storage target jobs to be managed by the job hold function program. A storage target job received from an external apparatus is stored in the hold queue buffer 531 together with print settings. Since the structure of the hold queue buffer 531 is similar to that of the print queue buffer 521, detailed descriptions thereof will be omitted.

The attribute of a job registered in each hold queue is managed by a hold queue job attribute table. Referring to FIG. 5C, a hold queue job attribute table 532 corresponding to a job is registered in the queue 1, and a hold queue job attribute table 533 corresponding to a job is registered in the queue 5. Actually, a number of the existing tables is identical with a number of queues of the hold queue buffer 531. The hold queue job attribute table 532 will be described in detail below.

The hold queue job attribute table 532 includes a job ID 532a for identifying a job and a flags 532b for identifying the result of the media mismatch determination. The hold queue job attribute table 532 does not include the entity of the job. Although, in the present exemplary embodiment, the hold queue job attribute table 532 does not include the entity of the job, it may include the entity of the job, for example, as a result of copy. The CPU 212 searches, among a plurality of entries 511, for the job ID 511a having the same value as the job ID 532a. Then, the CPU 212 acquires the print attribute 511b and the print data 511c of an entry 511 identified from the job ID 511a having the same value as the job ID 532a.

Processing performed since a job is input until it is stacked in the print queue buffer 521 or the hold queue buffer 531 will be described below. This processing is implemented when the CPU 212 of the controller unit 205 executes the job hold function program loaded from the ROM 207 or the HDD 209 into the RAM 208.

First, the user inputs a job to perform print processing by using the digital printer 102. A queue designation value regarding whether the job designates storage in the print queue buffer 521 or storage in the hold queue buffer 531 is recorded as an attribute of the job. After receiving a job input by the user, a unique ID is generated and assigned to the job. Then, one entry 511 is generated in each job. The generated job ID is input to the job ID 511a in the entry 511, the print attribute of the received job is input to the print attribute 511b in the entry 511, and the received print data is input to the print data 511c in the entry 511.

Then, the CPU 212 reads the above-described queue designation value. When the queue designation value indicates the print queue, the job is stacked in a queue of the print queue buffer 521. On the other hand, when the queue designation value indicates the hold queue, the job is stacked in a queue of the hold queue buffer 531.

Figure 5B:
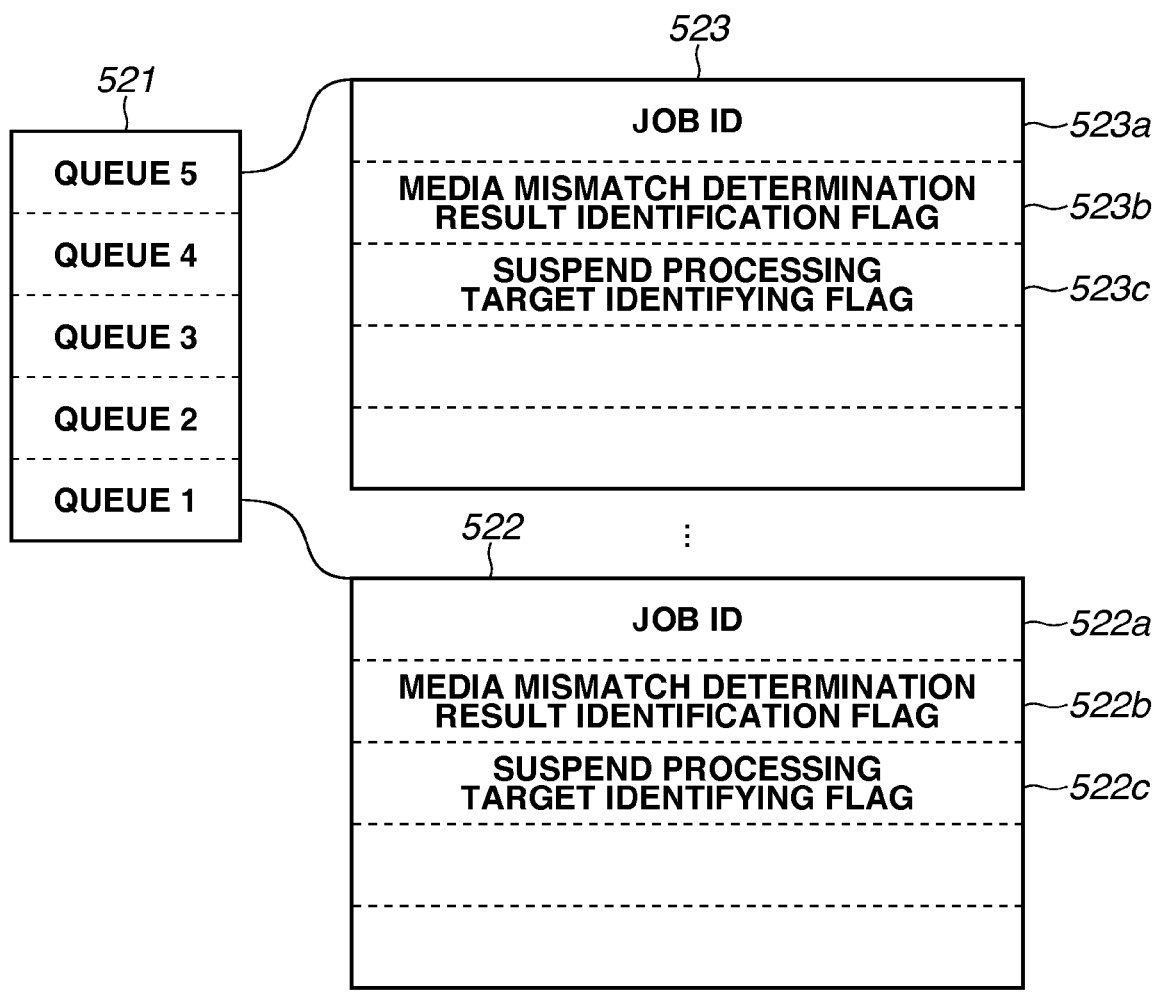
FIG. 5B illustrates the contents of a print queue buffer related to entries according to the first exemplary embodiment.

When stacking a job in a queue of the print queue buffer 521, the CPU 212 generates one print queue job attribute table 522 illustrated in FIG. 5B for each job. Then, the job ID is registered in the job ID 522a of the print queue job attribute table 522.

Figure 5C:
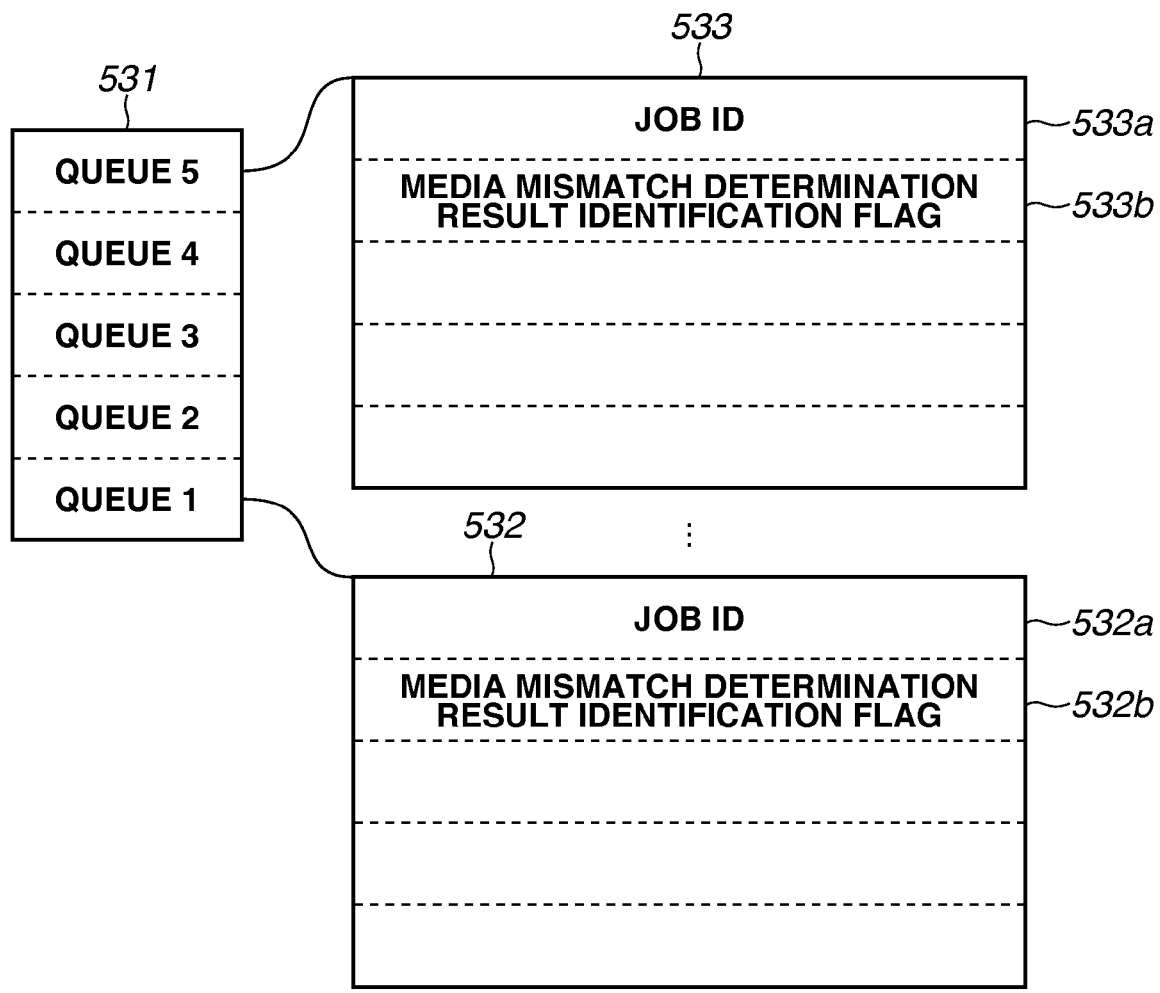
FIG. 5C illustrates the contents of data for a hold queue buffer related to entries according to the first exemplary embodiment.

On the other hand, when stacking a job in a queue of the hold queue buffer 531, the CPU 212 generates one hold queue job attribute table 532 illustrated in FIG. 5C for each job. Then, the job ID is registered in the job ID 532a of the hold queue job attribute table 532.

Operations based on the above-described configuration according to the present exemplary embodiment will be described below.

The media mismatch determination processing is started in a state where the screen illustrated in FIG. 14A is displayed on the display of the operation unit 204.

An example of the job hold function operation screen displayed on the operation unit 204 of the digital printer 102 according to the first exemplary embodiment will be described below with reference to FIG. 14A. This screen includes a plurality of display areas and a plurality of operation buttons. Important points of the first exemplary embodiment will be described below. The job hold function is a function of storing printing target data in the HDD 209 of the digital printer 102 until a print instruction is received from the user, and then performing printing according to the data in response to a print instruction from the user. The job hold function enables the digital printer 102 to store data for a plurality of print jobs in the HDD 209. The job hold function enables the user to designate the order of execution of print jobs selected from the plurality of print jobs stored in the HDD 209, and therefore can perform printing regardless of the order of storing in the HDD 209.

A hold job list 1402 is an area for displaying a list of print jobs stored in the above-described hold queue buffer 531 in the digital printer 102. In the example illustrated in FIG. 14A, six print jobs are displayed. The digital printer 102 can store in the HDD 209 a larger number of print jobs than the number of print jobs displayable in the hold job list 1402 at the same time. For example, if seven or more print jobs are stored in the HDD 209, when the user touches or presses scroll buttons 1408 and 1409, all of print jobs stored in the HDD 209 can be sequentially displayed in the hold job list 1402. The hold job list 1402 displays, for each of the print jobs, a job name 1404, a user name 1405, and a date/time field 1406 indicating the time and date on which the relevant print job was stored in the digital printer 102.

Based on the user name (operator name) 1405, a user who operates this job hold screen identifies the user's own job, and selects the relevant job as a printing target job.

Figure 14B:
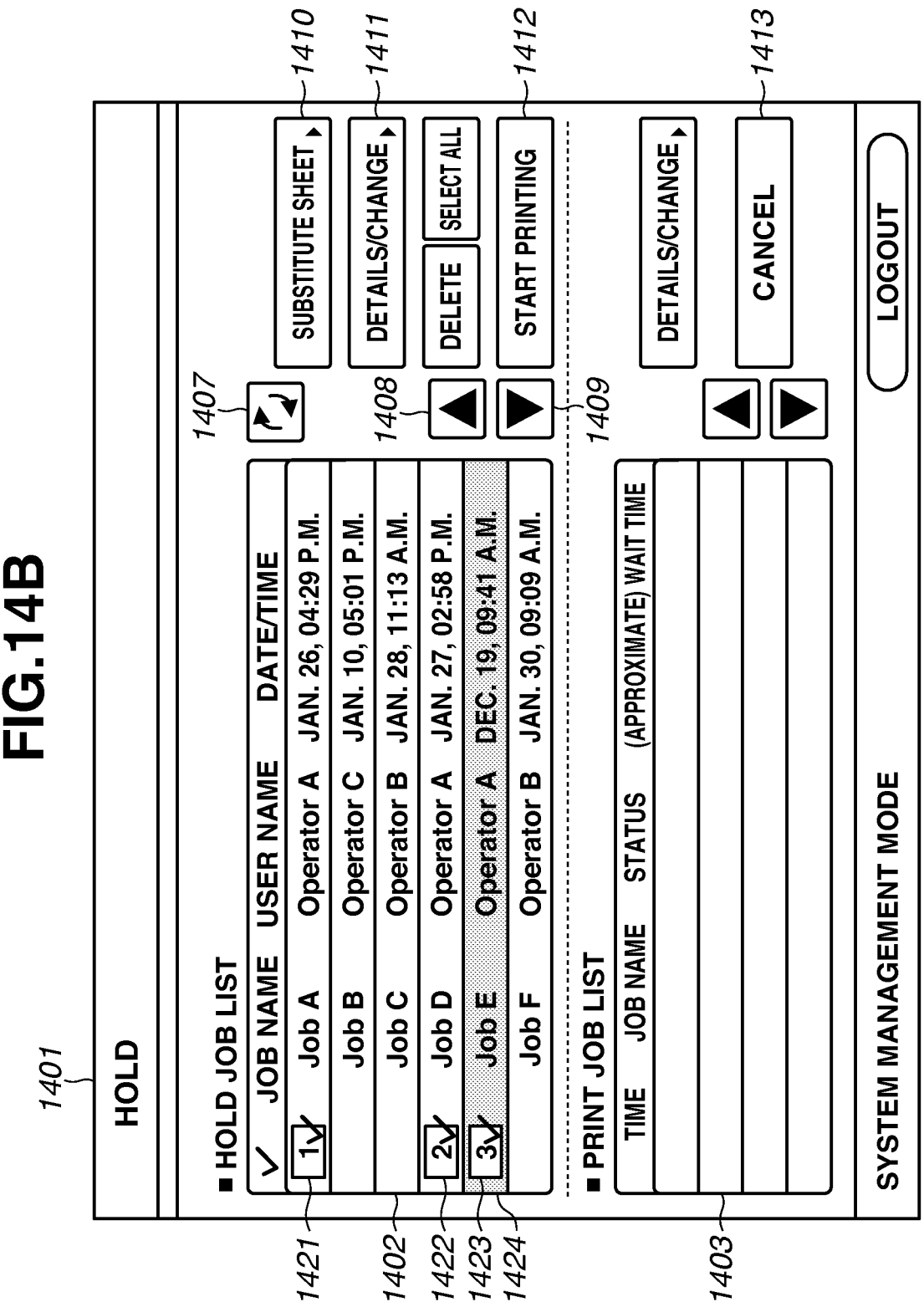
FIG. 14B illustrates an example of a job hold function operation screen displayed on the operation unit of the digital printer according to the first exemplary embodiment.

In this case, when the user presses or touches with the finger the portions of print jobs displayed in the hold job list 1402 (object selection), these print jobs are selected as printing target jobs. FIG. 14B illustrates a display example immediately after an operator A has selected print jobs by operating the job hold function operation screen displayed on the operation unit 204. In this case, the operator A selected three print jobs, Job A, Job D, and Job E, in this order. These jobs in the selected state are indicated by selection marks 1421, 1422, and 1423 to the left of the job name field. The selection mark 1424 indicates Job E selected last, and Job E is highlighted. This indicates that Job E is currently selected in the hold job list 1402.

A print job list 1403 displays print jobs about which print processing has been started by the digital printer 102, or print jobs waiting for the start of the print processing. The print job list 1403 also displays a list of print jobs stored in the above-described print queue buffer 521.

In the example illustrated in FIG. 14B, there is no print job about which print processing has been started. This means that the printer unit 203 of the digital printer 102 is in an idle state.

A DETAILS/CHANGE button 1411 is used to check details of the print jobs in the selected state in the hold job list 1402, or to shift to a screen for changing print specifications. In the example illustrated in FIG. 14B, when the DETAILS/CHANGE button 1411 is pressed in a state where Job E is selected last, the user is allowed to confirm detailed information of Job E and change settings thereof.

A START PRINTING button 1412 is used to instruct the start of the print processing for the print jobs selected in the hold job list 1402. When the START PRINTING button 1412 is pressed in a state where a print job is selected out of the print jobs displayed in the hold job list 1402, the selected print job is displayed in the print job list 1403 and shifts to the print processing wait state. A CANCEL button 1413 is used to stop execution of the print job when print processing has been started by the START PRINTING button 1412.

A media mismatch determination button 1407 is used to perform the media mismatch determination for the print jobs selected in the hold job list 1402. If there is no print job selected in the hold job list 1402, the media mismatch determination button 1407 may be grayed out (disabled). In the example illustrated in FIG. 14B, the media mismatch determination will be performed for Job A, Job D, and Job E in the selected state.

Figure 6:
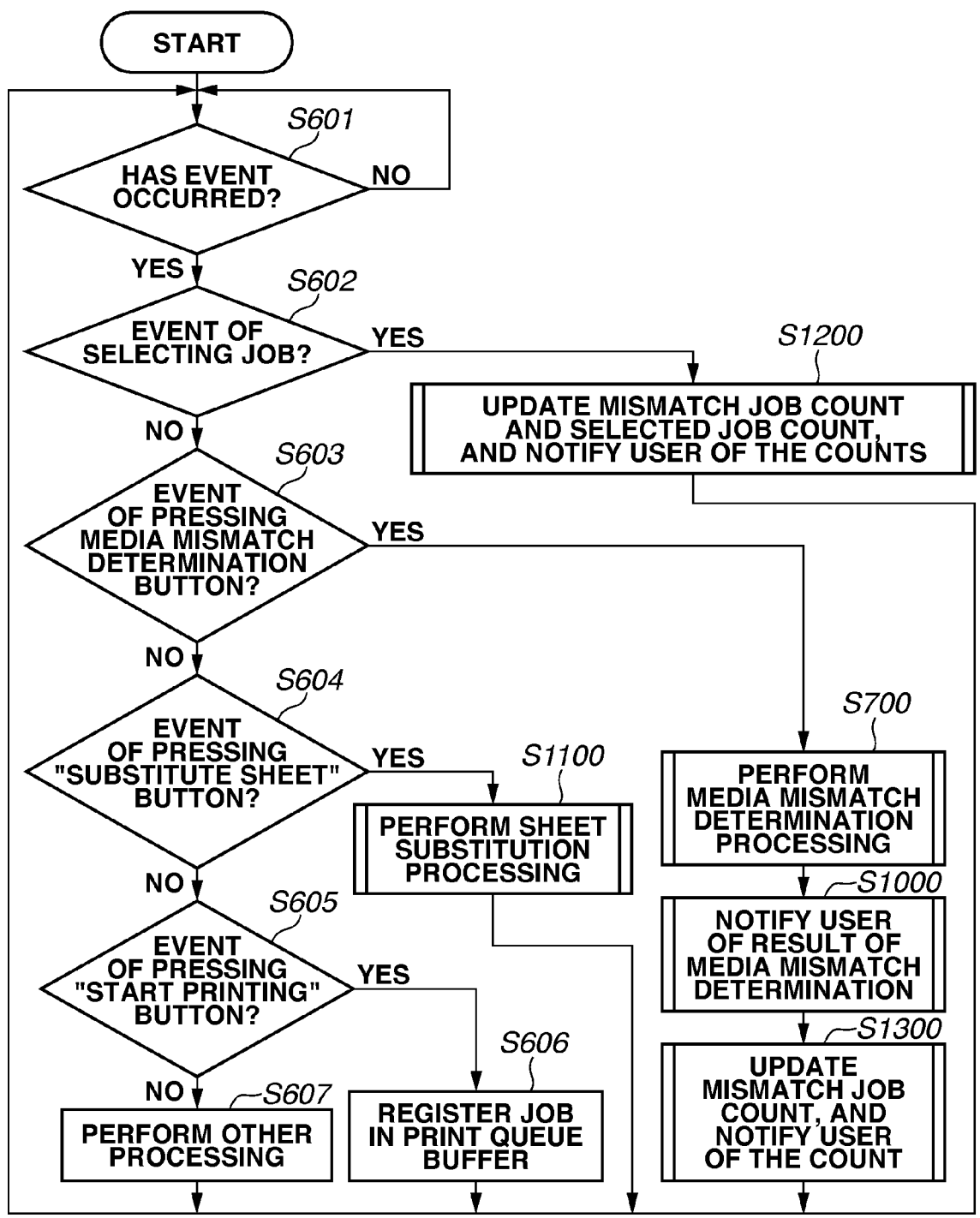
FIG. 6 is a flowchart illustrating a series of processing for the media mismatch determination in the digital printer according to the first exemplary embodiment.

A series of processing for the media mismatch determination according to the first exemplary embodiment performed on the jobs stacked in the hold queue buffer 531 will be described in detail below with reference to the flowchart illustrated in FIG. 6. This processing is implemented when the CPU 212 of the controller unit 205 executes the UI function program loaded from the ROM 207 or the HDD 209 into the RAM 208. The processing of the flowchart illustrated in FIG. 6 is started in a state where jobs are stacked in the hold queue buffer 531 and the hold job list 1402 is displayed on the operation unit 204.

In step S601, the CPU 212 waits for a user operation on the screen illustrated in FIG. 14A displayed on the operation unit 204. In this case, the CPU 212 repeats step S601 until the user performs a certain operation. When the user performs an operation on the operation unit 204 (YES in step S601), then in step S602, the CPU 212 determines whether the user operation is an event of selecting a print job. When the user operation is determined to be an event of selecting a print job (YES in step S602), then in step S1200, the CPU 212 performs the processing for updating the mismatch job count and selected job count and notifying the user of the counts (hereinafter simply referred to as mismatch job count and selected job count update and notification), and returns to step S601. The mismatch job count and selected job count update and notification in step S1200 will be described in detail below with reference to FIG. 12.

On the other hand, when the user operation is determined to be not an event of selecting a print job (NO in step S602), the CPU 212 proceeds to step S603. Even in this case (NO in step S602), any print job may be in the selected state. For example, when the user operation is determined to be an event of selecting a print job (YES in step S602), then in step S1200, the CPU 212 may change the print job to the selected state, and return to step S601. Specifically, as illustrated in FIG. 14B, in a state where a print job is selected on the job hold screen 1401 displayed on the operation unit 204, the CPU 212 waits for a user operation in step S601.

In step S603, the CPU 212 determines whether the media mismatch determination button 1407 illustrated in FIG. 14B is pressed by the user operation. When the media mismatch determination button 1407 is determined to be pressed (YES in step S603), the CPU 212 proceeds to step S700. The media mismatch determination button 1407 may be grayed out (disabled) in a state where no print job is selected. Further, if the media mismatch determination is to be performed only on selected print jobs, the CPU 212 may not proceed to step S700 even if the media mismatch determination button 1407 is pressed in a state where no print job is selected. Meanwhile, the media mismatch determination may be performed on all jobs stacked in the hold queue buffer 531 when the media mismatch determination button 1407 is pressed.

In step S700, the CPU 212 performs the media mismatch determination processing. The media mismatch determination processing in step S700 will be described in detail below with reference to FIG. 7.

After completion of the media mismatch determination processing in step S700, then in step S1000, the CPU 212 performs processing for notifying the user of the result of the media mismatch determination (hereinafter simply referred to as media mismatch determination result notification). The media mismatch determination result notification in step S1000 will be described in detail below with reference to FIG. 10.

After completion of the media mismatch determination result notification in step S1000, then in step S1300, the CPU 212 performs the processing for updating the mismatch job count and notifying the user of the count (hereinafter simply referred to as mismatch job count update and notification), and returns to step S601. The mismatch job count update and notification in step S1300 will be described in detail below with reference to FIG. 13.

On the other hand, when the media mismatch determination button 1407 is determined to be not pressed (NO in step S603), then in step S604, the CPU 212 determines whether the SUBSTITUTE SHEET button 1410 illustrated in FIG. 14B is pressed by the user operation. The SUBSTITUTE SHEET button 1410 may be grayed out (disabled) in a state where no print job is selected. When the SUBSTITUTE SHEET button 1410 is determined to be pressed (YES in step S604), the CPU 212 proceeds to step S1100.

In step S1100, the CPU 212 performs sheet substitution processing for a substitute sheet to be used by the selected job. The sheet substitution processing in step S1100 will be described in detail below with reference to FIG. 11. After completion of the sheet substitution processing in step S1100, the CPU 212 returns to step S601. After completion of the sheet substitution processing in step S1100, the CPU 212 may proceed to step S700, instead of returning to step S601, and perform the media mismatch determination processing by replacing the sheet to be used by the job with the substitute sheet designated in step S1100.

On the other hand, when the SUBSTITUTE SHEET button 1410 is determined to be not pressed (NO in step S604), then in step S605, the CPU 212 determines whether the START PRINTING button 1412 illustrated in FIG. 14B is pressed by the user operation.

When the START PRINTING button 1412 is determined to be pressed (YES in step S605), the CPU 212 proceeds to step S606. In a state where no job is selected, the START PRINTING button 1412 may be grayed out (disabled).

In step S606, the CPU 212 registers in the print queue buffer 521 the job selected from the hold job list 1402 illustrated in FIG. 14B to be designated for the print processing. At this timing, the job registered in the print queue buffer 521 is displayed in the print job list 1403 illustrated in FIG. 14B, and the CPU 212 changes the job to the print processing wait state. After registering the job in the print queue buffer 521 in step S606, the CPU 212 returns to step S601.

On the other hand, when the START PRINTING button 1412 is determined to be not pressed (NO in step S605), then in step S607, the CPU 212 performs other processing according to the user operation. The processing in step S607 possibly is, for example, selecting a job that has undergone the media mismatch determination, and pressing the DETAILS/ CHANGE button 1411 illustrated in FIG. 14B to make a transition to a screen for calling details of the job in the selected state.

Figure 7:
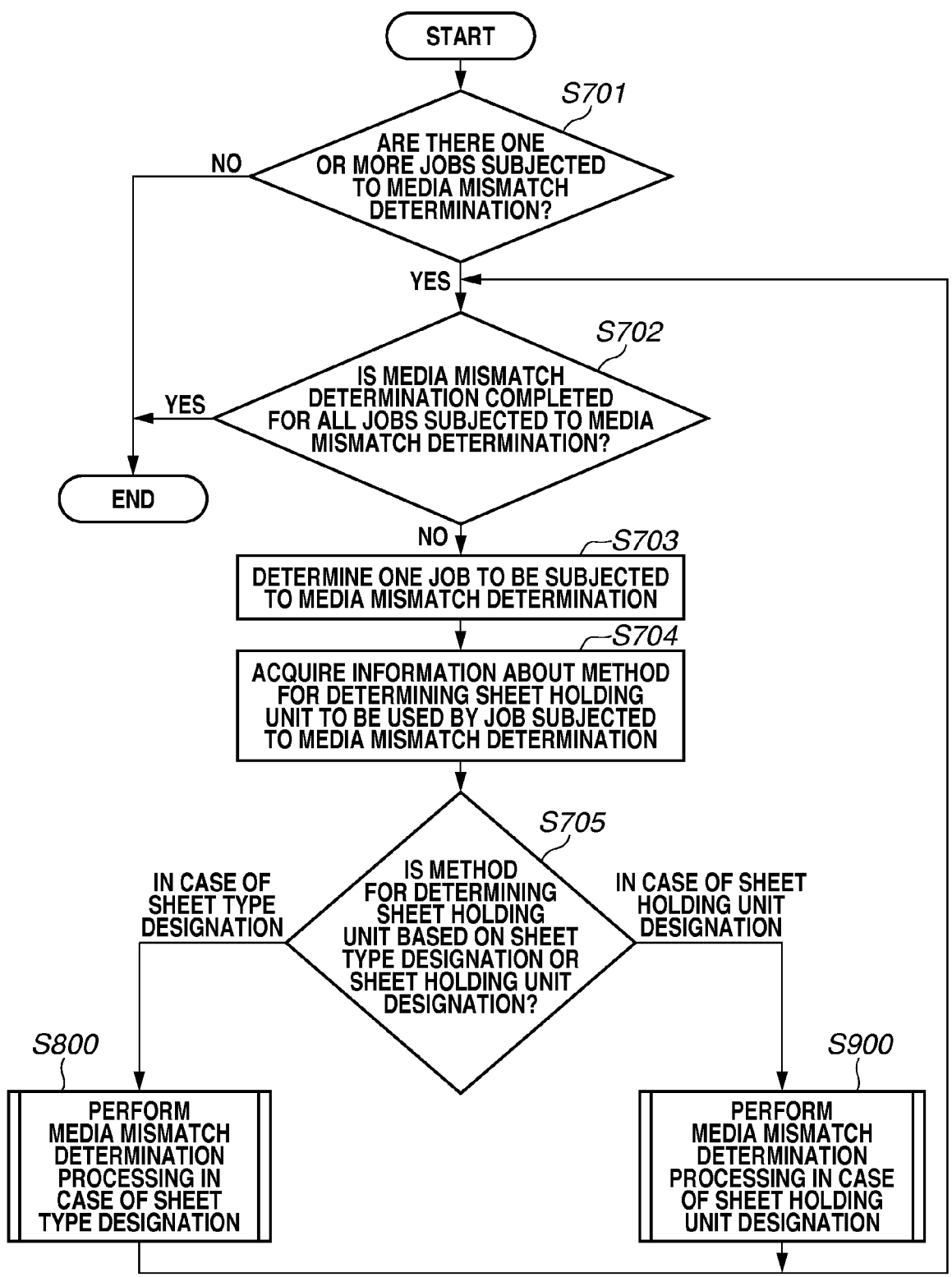
FIG. 7 is a flowchart illustrating the media mismatch determination processing (in step S700) illustrated in FIG. 6 in the digital printer according to the first exemplary embodiment.

FIG. 7 is a flowchart illustrating in detail the processing in step S700 illustrated in FIG. 6, i.e., the media mismatch determination processing according to the first exemplary embodiment. This processing is implemented when the CPU 212 of the controller unit 205 executes the media mismatch determination function program loaded from the ROM 207 or the HDD 209 into the RAM 208. The CPU 212 performs the media mismatch determination processing according to the first exemplary embodiment in step S700 when the media mismatch determination button 1407 is pressed. When the media mismatch determination button 1407 is pressed again, the CPU 212 performs the media mismatch determination again, and updates the result of the determination.

In the first exemplary embodiment, the print jobs selected by the user out of the print jobs currently displayed in the hold job list 1402, will be subjected to the processing described below. Although the print jobs selected by the user are subjected to the processing, the configuration is not limited thereto. All of the print jobs stacked in the hold queue buffer 531 may be subjected to the processing described below.

In step S701, the CPU 212 determines whether there are one or more print jobs subjected to the media mismatch determination. When there are one or more print jobs subjected to the media mismatch determination (YES in step S701), the CPU 212 proceeds to step S702. On the other hand, when there is no print job subjected to the media mismatch determination (NO in step S701), the CPU 212 ends the media mismatch determination processing in step S700 illustrated in FIG. 7, and proceeds to step S1000 illustrated in FIG. 6.

In step S702, the CPU 212 determines whether the media mismatch determination processing is completed for all of the print jobs subjected to the media mismatch determination. When it is determined that the media mismatch determination has not been completed for all of the print jobs subjected to the media mismatch determination (NO in step S702), the CPU 212 proceeds to step S703. On the other hand, when it has been determined that the media mismatch determination has been completed for all of the print jobs subjected to the media mismatch determination (YES in step S702), the CPU 212 ends the media mismatch determination processing in step S700, and proceeds to step S1000 illustrated in FIG. 6.

In step S703, the CPU 212 determines one print job to be subjected to the media mismatch determination. In step S704, the CPU 212 acquires information about whether the sheet holding unit to be used by the print job, which is subjected to the media mismatch determination in step S703, is determined based on sheet type designation or sheet holding unit designation. Then, the CPU 212 proceeds to step S705.

In step S705, the CPU 212 determines whether the sheet holding unit to be used by the print job is determined based on sheet type designation or on sheet holding unit designation. In the case of a print job with a sheet type designation, the CPU 212 instructs the media management unit 211 to refer to a sheet management table as illustrated in FIG. 16.

An example sheet management table for managing information about sheet types stored in respective sheet holding units of the digital printer 102 will be described below with reference to FIG. 16. The sheet management table is stored in the HDD 209, and referred to by the CPU 212. In the example illustrated in FIG. 16, for each of the 10 sheet holding units provided by the digital printer 102, information about a size 1612, a medium type 1613, and a remaining sheet amount 1614 are managed by using a sheet holding unit ID 1611 as a key. The remaining sheet amount in each sheet holding unit is detected by a sensor provided therein.

For example, a column 1601 indicates that a sheet holding unit (ID=1) stores A4-size medium type "PLAIN PAPER 1", and that the remaining sheet amount is 3. The remaining sheet amount 1614 has the following four different values: 3=FULL (100%), 2=SMALL REMAINING AMOUNT (25%), 1=VERY SMALL REMAINING AMOUNT (less than 5%), and 0=ZERO REMAINING AMOUNTING AMOUNT (0%). The accuracy of remaining sheet amount detection can be increased by increasing the accuracy of the remaining amount sensor. However, the digital printer 102 according to the first exemplary embodiment performs remaining amount detection according to the above-described specifications. For example, FULL (100%) indicates a state where 3,000 sheets are stored in a sheet holding unit which accommodates storage of 3,000 sheets. SMALL REMAINING AMOUNT (25%) indicates a state where 750 sheets are stored in the sheet holding unit which accommodates storage of 3,000 sheets. VERY SMALL REMAINING AMOUNT (less than 5%) indicates a state where less than 150 sheets are stored in the sheet holding unit which accommodates storage of 3,000 sheets. ZERO REMAINING AMOUNTING AMOUNT (0%) indicates a state where no sheet is stored in the sheet holding unit which accommodates storage of 3,000 sheets. Thus, the sensor provided in each sheet holding unit can detect the remaining amount of sheets stored in each sheet holding unit in three steps.

For example, a print job with a sheet type designation of A4 colored paper (red) refers to the sheet management table illustrated in FIG. 16 to determine whether A4 colored paper (red) is registered in any one of the sheet holding units. As a result, it is determined that the size of the sheet stored in a sheet holding unit (ID=2) stores A4-size medium type "COLORED PAPER (RED)", the sheet holding unit (ID=2) is determined as an applicable sheet holding unit. On the other hand, in the case of a print job designating a sheet holding unit (ID=3), the sheet management table illustrated in FIG. 16 is referred to, and A3-size "PLAIN PAPER 1" stored in the sheet holding unit (ID 3) is fed.

When the relevant print job is determined to be a job designating a sheet type (IN CASE OF SHEET TYPE DESIGNATION in step S705), the CPU 212 proceeds to step S800. On the other hand, when it is determined that the relevant job is based on sheet holding unit designation (IN CASE OF SHEET HOLDING UNIT DESIGNATION in step S705), the CPU 212 proceeds to step S900. Processing in step S800 and processing in step S900 will be described in detail below with reference to FIGS. 8 and 9, respectively. After completion of the processing in step S800 or S900, the CPU 212 returns to step S702.

Figure 8:
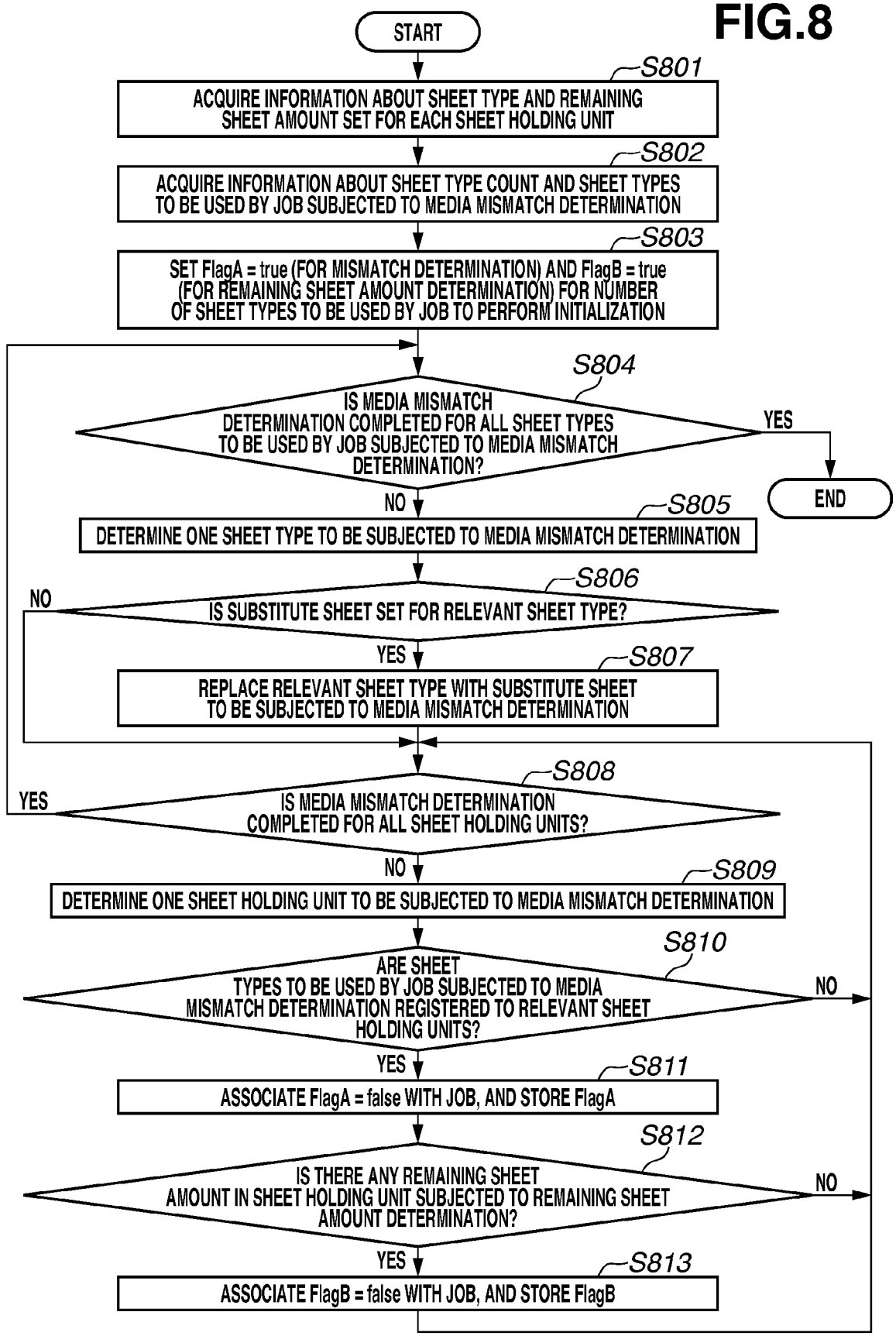
FIG. 8 is a flowchart illustrating the media mismatch determination processing (in step S800) in a case where the print job illustrated in FIG. 7 designates a sheet type, in the digital printer according to the first exemplary embodiment.

FIG. 8 is a flowchart illustrating in detail the processing in step S800 of FIG. 7, i.e., the media mismatch determination processing performed when the print job subjected to the media mismatch determination is a job designating a sheet type. This processing is implemented when the CPU 212 of the controller unit 205 executes the media mismatch determination function program loaded from the ROM 207 or the HDD 209 into the RAM 208.

In step S801, the CPU 212 acquires information about the sheet type and the remaining sheet amount set to each sheet holding unit of the digital printer 102. The processing in step S801 is implemented when the CPU 212 instructs the media management unit 211, for example, to refer to the sheet management table illustrated in FIG. 16. In step S802, for the print job subjected to the media mismatch determination, the CPU 212 reads a print job stored in the hold queue buffer 531. Then, the CPU 212 acquires the number of sheet types subjected to sheet type designation out of the sheet types to be used by print jobs as illustrated in FIG. 17.

FIG. 17 illustrates sheet information used by jobs Job A, Job D, and Job E illustrated in FIG. 14B. When the job hold function program stores a print job in the hold queue buffer 531, the illustrated information is also stored therein by simultaneously storing the print settings. The sheet information to be used by the print job is included in the print settings. FIG. 17 illustrates that Job A uses two different sheet types: an A4-size medium type "PLAIN PAPER 1", and an A4-size medium type "TWO-SIDED COATED PAPER 1". FIG. 17 further illustrates that Job D uses two different sheet types: a LTR-size medium type "PLAIN PAPER 1" and an "11×17"-size medium type "PLAIN PAPER 1". FIG. 17 further illustrates that Job E uses three different sheet types: an A4-size medium type "PLAIN PAPER 1", an A4-size medium type "COLORED PAPER (RED)", and an A3-size medium type "TWO-SIDED COATED PAPER 2". The sheet type is determined by the combination of the size and the medium type.

In step S803, the CPU 212 sets two different flags (FlagA and FlagB) for retaining the result of the media mismatch determination to perform initialization processing. A number of the two flags is equal to a number of sheet types acquired in step S802. FlagA is used to retain the result of the determination whether the attribute information of the sheet type to be used by the print job is registered in any one of the sheet holding units, and is stored in the RAM 208. On the other hand, FlagB is used to retain the result of the determination whether there is a remaining amount of sheets of the sheet type to be used by the print job, and is stored in the RAM 208. FlagA=true indicates a media mismatch (sheet type mismatch) state where the print job designates a sheet type which is not set to any sheet holding unit. On the other hand, FlagB=true indicates another media mismatch (zero remaining sheet amount) state where there is no remaining amount of sheets of the sheet type to be used by the print job. FlagA is initialized to be true (mismatch), and FlagB is initialized to be true (zero remaining amount).

In step S804, the CPU 212 determines whether the media mismatch determination processing is completed for all of the sheet types to be used by the print job subjected to the media mismatch determination. When it is determined that the media mismatch determination processing is completed not for all of the sheet types to be used by the print job subjected to the media mismatch determination (NO in step S804), then in step S805, the CPU 212 determines one sheet type to be subjected to the media mismatch determination in the relevant print job, and proceeds to step S806.

In step S806, the CPU 212 determines whether the substitute sheet designated in step S1100 is set for the sheet type subjected to the media mismatch determination determined in step S805. The processing flow for setting the substitute sheet (in step S1100) will be described in detail below with reference to FIG. 11. When it is determined that the substitute sheet is set (YES in step S806), then in step S807, the CPU 212 replaces the relevant sheet type subjected to the media mismatch determination by the substitute sheet, and proceeds to subsequent processing for the media mismatch determination. On the other hand, when it is determined that the substitute sheet is not set (NO in step S806), the CPU 212 proceeds to step S808.

In step S808, the CPU 212 determines whether the media mismatch determination processing is completed for all of the sheet holding units provided by the digital printer 102. When it is determined that the media mismatch determination processing is completed not for all of the sheet holding units (NO in step S808), then in step S809, the CPU 212 determines one sheet holding unit to be subjected to the subsequent media mismatch determination, and proceeds to step S810.

In step S810, the CPU 212 determines whether the sheet type subjected to the media mismatch determination decided in step S805 (or the substitute sheet type designated in step S807) corresponds to the sheet type registered in the sheet holding unit subjected to the media mismatch determination decided in step S809. When it is determined that the relevant two sheet types correspond to each other (YES in step S810), the CPU 212 proceeds to step S811. On the other hand, when it is determined that the relevant two sheet types do not correspond to each other (NO in step S810), the CPU 212 returns step S808, and proceeds to subsequent processing.

In step S811, the CPU 212 stores the value of FlagA in association with the print job as "false (match)" indicating that the print job designates the sheet type registered in the sheet holding unit. In step S812, the CPU 212 determines whether there is a remaining sheet amount in the sheet holding unit subjected to the media mismatch determination decided in step S809. When the CPU 212 determines that there is a remaining sheet amount in the relevant sheet holding unit (YES in step S812), then in step S813, the CPU 212 stores the value of FlagB in association with the print job as "false (there is a remaining amount)" indicating that there is a remaining amount of sheets of the sheet type to be used by the print job. Then, the CPU 212 returns to step S808, and proceeds to subsequent processing. On the other hand, when the CPU 212 determines that there is no remaining sheet amount in the relevant sheet holding unit (NO in step S812), the CPU 212 returns to step S808, and proceeds to subsequent processing.

When it is determined that the media mismatch determination processing is completed for all of the sheet holding units (YES in step S808), the CPU 212 returns to step S804, and proceeds to subsequent processing. When it is determined that the media mismatch determination processing is completed for all of the sheet types to be used by the print job subjected to the media mismatch determination (YES in step S804), the CPU 212 ends the media mismatch determination processing in step S800 performed in the case of sheet type designation, and returns to step S702 illustrated in FIG. 7. The above is detailed descriptions of the media mismatch determination processing in the case of sheet type designation in step S800 illustrated in FIG. 7.

Figure 9:
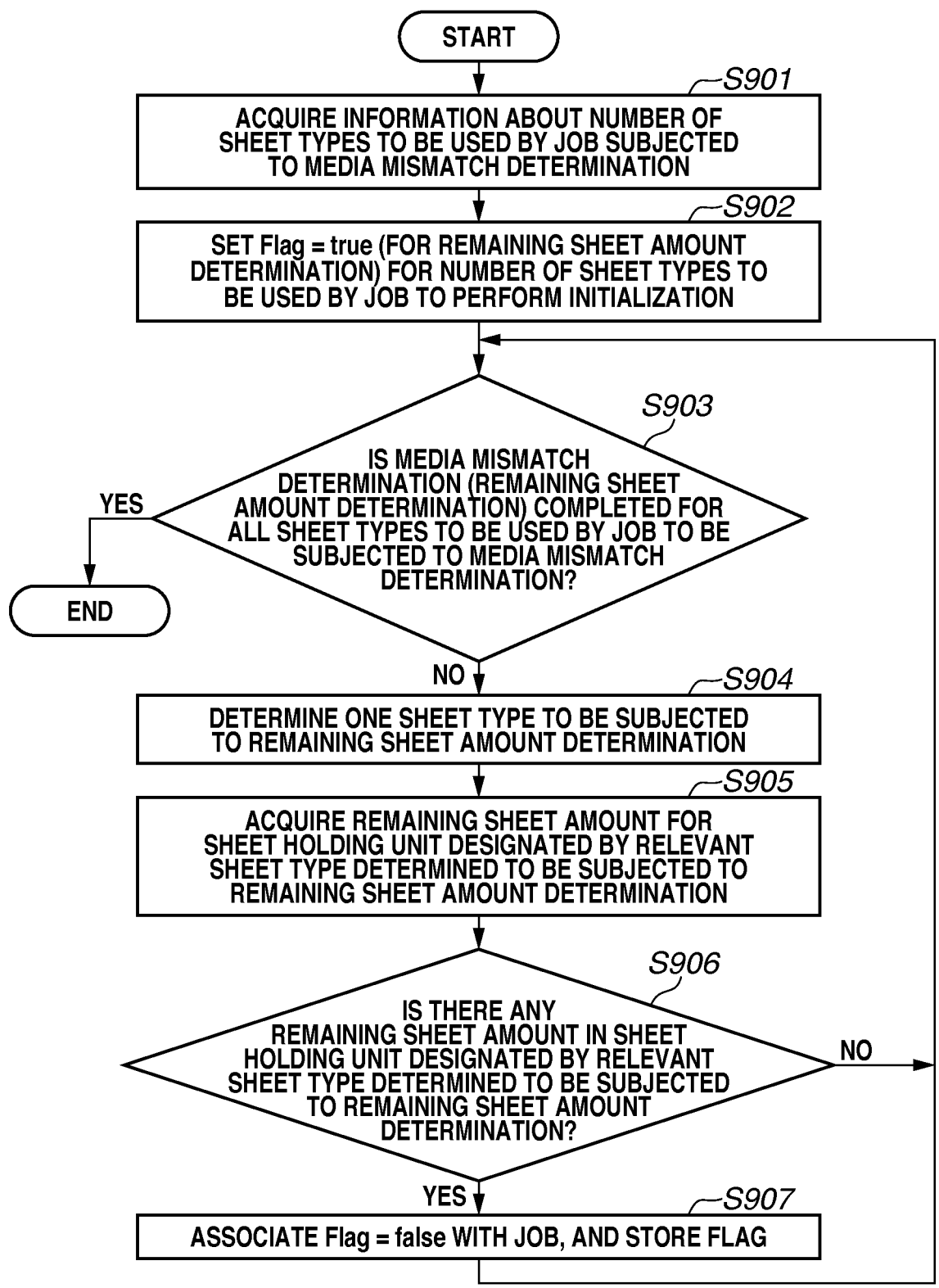
FIG. 9 is a flowchart illustrating the media mismatch determination processing (in step S900) in a case where the print job illustrated in FIG. 7 designates a sheet holding unit in the digital printer according to the first exemplary embodiment.

On the other hand, when it is determined that the relevant job designates a sheet holding unit (IN CASE OF SHEET HOLDING UNIT DESIGNATION in step S705), the CPU 212 proceeds to step S900. FIG. 9 is a flowchart illustrating the processing in step S900 of FIG. 7. i.e., the media mismatch determination processing performed when the print job subjected to the media mismatch determination is a job designating a sheet holding unit This processing is implemented when the CPU 212 of the controller unit 205 executes the media mismatch determination function program loaded from the ROM 207 or the HDD 209 into the RAM 208.

In step S901, for the print job subjected to the media mismatch determination, the CPU 212 acquires the number of sheet types designating a sheet holding unit out of the sheet types to be used by the print job, as information of the sheet types to be used by the print job, as illustrated in FIG. 17. In step S902, CPU 212 sets a flag (Flag) for retaining the result of the media mismatch determination (remaining sheet amount determination) for the number of sheet types acquired in step S901 to perform initialization processing.

The Flag is used to retain the result of the determination whether there is a remaining amount of sheets of the sheet type to be used by the print job, and is stored in the RAM 208. Flag=true indicates the media mismatch (zero remaining amount) state where there is no remaining amount of sheets of the sheet type to be used by the print job. Flag is initialized to be true (zero remaining amount). For a job designating a sheet holding unit, the CPU 212 does not determine whether the sheet types to be used by the job are registered in the sheet holding units designated by the job, and therefore does not hold a flag for the sheet type mismatch determination.

In step S903, then, the CPU 212 determines whether the media mismatch determination (remaining sheet amount determination) processing is completed for all of the sheet types to be used by the print job subjected to the media mismatch determination (remaining sheet amount determination). When it is determined that the media mismatch determination (remaining sheet amount determination) processing is completed not for all of the sheet types to be used by the print job subjected to the media mismatch determination (NO in step S903), then in step S904, the CPU 212 determines one sheet type to be subjected to the media mismatch determination (remaining sheet amount determination) in the relevant print job, and proceeds to step S905. In step S905, the CPU 212 acquires information about the remaining sheet amount in the sheet holding unit designated for the relevant sheet type about which the remaining sheet amount is to be determined which is determined in step S904, out of the sheet types to be used by the relevant print job. The processing in step S905 is implemented when the CPU 212 instructs the media management unit 211, for example, to refer to the sheet management table illustrated in FIG. 16.

In step S906, the CPU 212 determines whether there is a remaining sheet amount in the relevant sheet holding unit acquired in step S905. When the CPU 212 determines that there is a remaining sheet amount in the relevant sheet holding unit (YES in step S906), then in step S907, the CPU 212 stores the value of Flag in association with the print job as "false (there is a remaining amount)" indicating that there is a remaining amount of sheets of the sheet type to be used by the print job. Then, the CPU 212 returns to step S903, and proceeds to subsequent processing.

On the other hand, when the CPU 212 determines that there is no remaining sheet amount in the relevant sheet holding unit (NO in step S906), the CPU 212 returns to step S903, and proceeds to subsequent processing.

When the media mismatch determination (remaining sheet amount determination) is completed for all of the sheet types to be used by the print job subjected to the media mismatch determination (YES in step S903), the CPU 212 ends the media mismatch determination processing in step S900 performed in the case of sheet holding unit designation.

The above is detailed descriptions of the media mismatch determination processing in the case of sheet holding unit designation in step S900 illustrated in FIG. 7.

Figure 10:
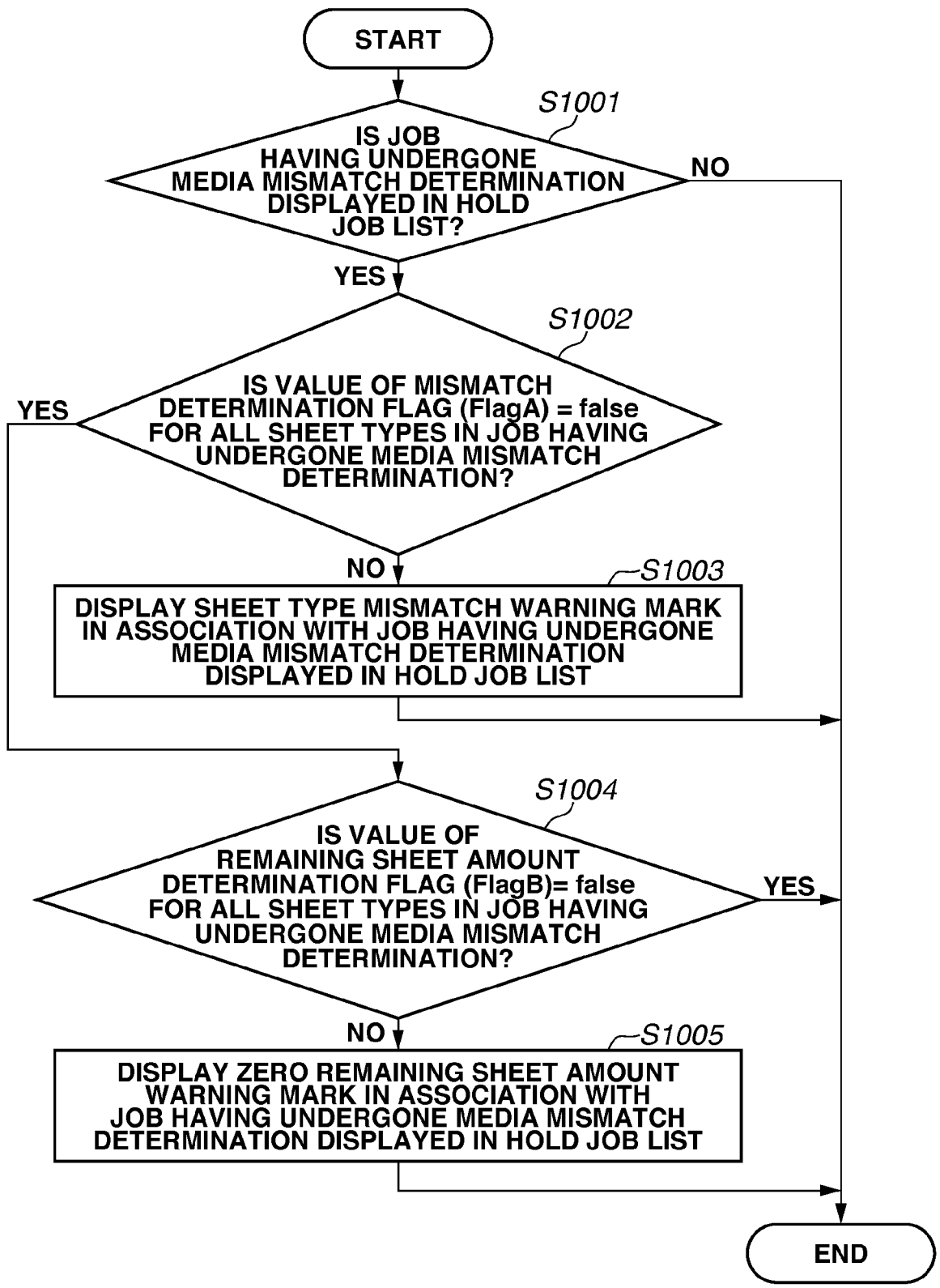
FIG. 10 is a flowchart illustrating the media mismatch determination result notification (in step S1000) illustrated in FIG. 6 in the digital printer according to the first exemplary embodiment.

FIG. 10 is a flowchart illustrating the processing in step S1000 illustrated in FIG. 6, i.e., the processing for notifying the hold job list 1402 of the result of the media mismatch determination. This processing is implemented when the CPU 212 of the controller unit 205 executes the UI function program loaded from the ROM 207 or the HDD 209 into the RAM 208.

In step S1001, the CPU 212 determines whether the print job having undergone the media mismatch determination is displayed in the hold job list 1402. When it is determined that the print job having undergone the media mismatch determination is being displayed in the hold job list 1402 (YES in step S1001), the CPU 212 proceeds to step S1002.

In S1002, the CPU 212 reads from the RAM 208 the value of FlagA for retaining the result of the sheet type mismatch determination (in which the CPU 212 determined whether the attribute information of the sheet type to be used by the print job having undergone the media mismatch determination is registered in any one sheet holding unit), and determines whether the value of FlagA is "false (match)".

Figure 14C:
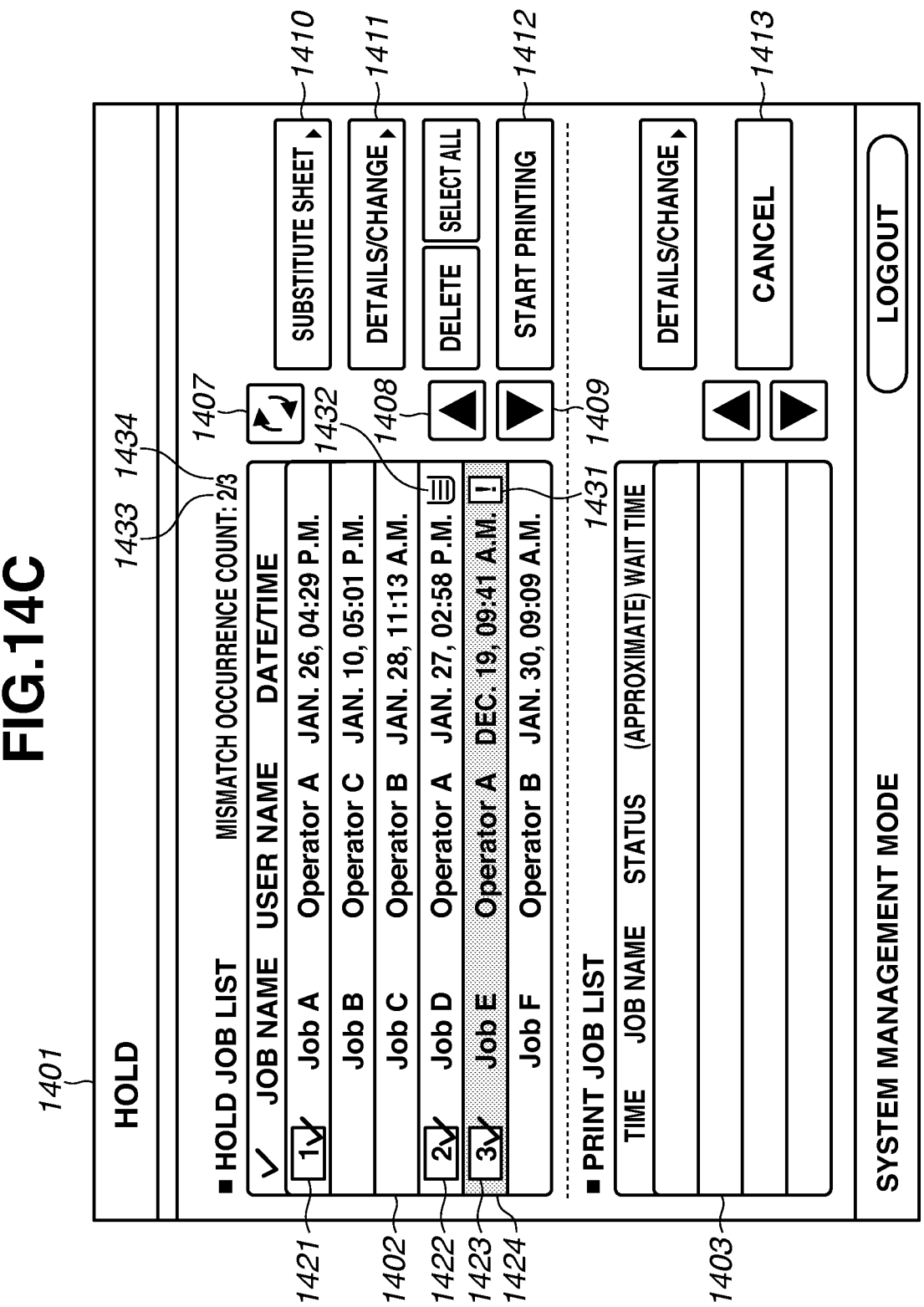
FIG. 14C illustrates an example of a job hold function operation screen displayed on the operation unit of the digital printer according to the first exemplary embodiment.

When it is determined that the value of FlagA is true (mismatch) for at least one sheet type (NO in step S1002), it indicates the media mismatch (sheet type mismatch) state, i.e., a state where the relevant print job designates a sheet type which is not set to any sheet holding unit. In this case (NO in step S1002), then in step S1003, as illustrated in FIG. 14C for example, the CPU 212 displays a sheet type mismatch warning mark (hereinafter simply referred to as mismatch mark) 1431 in an entry of the relevant print job of the hold job list 1402 to indicate that the relevant job is in the media mismatch state. The mismatch mark 1431 indicates that a certain sheet type (size and medium type) to be used by the print job is not set to any sheet holding unit. Then, the CPU 212 ends a series of processing for the media mismatch determination result notification in step S1000, and proceeds to step S1300 illustrated in FIG. 6.

On the other hand, when it is determined that the value of FlagA is false (match) for all of the sheet types (YES in step S1002), then in step S1004, the CPU 212 reads the value of FlagB from the RAM 208, and determines whether the value of FlagB is "false (there is a remaining amount)". FlagB is used to retain the result of the remaining sheet amount determination in which the CPU 212 has determined whether there is a remaining amount of sheets of the sheet type to be used by the print job having undergone the media mismatch determination.

When the value of FlagB is determined to be true (zero remaining amount) for at least one sheet type (NO in step S1004), it indicates the media mismatch (zero remaining sheet amount) state, i.e., a state where there is no remaining amount of sheets of the sheet type to be used by the print job. In this case (NO in step S1004), then in step S1005, as illustrated in FIG. 14C for example, the CPU 212 displays a zero remaining sheet amount warning mark (hereinafter simply referred to as zero remaining amount mark) 1432 in an entry of the relevant print job of the hold job list 1402 to indicate that the relevant print job is in the media mismatch state. The zero remaining amount mark 1432 indicates that there is no remaining amount of sheets although the sheet type to be used by the print job is set to the sheet holding unit. Then, the CPU 212 ends a series of processing for the media mismatch determination result notification in step S1000, and proceeds to step S1300 illustrated in FIG. 6.

On the other hand, when it is determined that the value of FlagB is false for all of the sheet types, i.e., there is a remaining amount of sheets for all of the sheet types to be used by the print job (YES in step S1004), the CPU 212 ends a series of processing for the media mismatch determination result notification in step S1000, and proceeds to step S1300 illustrated in FIG. 6.

In the above descriptions, as a result of performing the media mismatch determination, the CPU 212 notifies the user of a print job in which sheet type mismatch has occurred, by displaying the sheet type mismatch warning mark in association with the relevant job in step S1003, and notifies the user of a print job in which zero remaining sheet amount has occurred, by displaying the zero remaining sheet amount warning mark in association with the relevant job in step S1005. However, the configuration is not limited thereto. As long as the user is able to confirm that sheet type mismatch or zero remaining sheet amount has occurred in a print job before issuing an instruction for executing the relevant job, the CPU 212 may notify the user that sheet type mismatch or zero remaining sheet amount has occurred, by using other recognizable marks, sound, and light.

An example operation screen after notifying the hold job list 1402 of the result of the media mismatch determination in the digital printer 102 according to the first exemplary embodiment will be described below with reference to FIG. 14C. On the other hand, FIG. 14B illustrates example display immediately after the operator A operates the job hold function operation screen displayed on the operation unit 204 and selects a print job. Referring to FIG. 14C, components equivalent to those in FIG. 14B are assigned the same reference numerals. Similar to FIG. 14B, in FIG. 14C, the operator A selects three jobs (Job A, Job D, and Job E) in this order.

Referring to FIG. 14C, for each of the three jobs (Job A, Job D, and Job E) selected by the user, the CPU 212 checks the consistency between the sheet types to be used by each print job and the sheet types set to the respective sheet holding units of the digital printer 102 (media mismatch determination).

For example, in Job A, the sheet types to be used by the print job are set to the relevant sheet holding units, and the remaining sheet amounts are not zero, as illustrated in FIGS. 16 and 17. Therefore, neither the mismatch mark 1431 nor the zero remaining amount mark 1432 is displayed in Job A. In this case, the user is able to know, before instructing to start printing, that the possibility of the occurrence of media mismatch when the the START PRINTING button 1412 is pressed is very low.

In job D, the sheet types to be used by the print job are set to the sheet holding units but there is no remaining amount of sheets of a certain sheet type, as illustrated in FIGS. 16 and 17. Specifically, there is no remaining amount of sheets having the "11×17"-size medium type "PLAIN PAPER 1" set in the "sheet holding unit 9". Therefore, when the START PRINTING button 1412 is pressed in this state, media mismatch (zero remaining sheet amount) occurs when the "11×17"-size sheet is fed, and the print processing stops. Therefore, the zero remaining amount mark 1432 is displayed at Job D. When the user recognizes that the zero remaining amount mark 1432 is displayed, the user may take a suitable action, i.e., supplies the "11×17"-size medium type "PLAIN PAPER 1" to the sheet holding unit 9.

In Job E, a certain sheet type to be used by the print job is not set to any sheet holding unit, as illustrated in FIGS. 16 and 17. Specifically, the A3-size medium type "TWO-SIDED COATED PAPER 2" is not set to any sheet holding unit. Therefore, the mismatch mark 1431 is displayed at Job E. When the DETAILS/CHANGE button 1411 is pressed in the state illustrated in FIG. 14C, the sheet size and the medium type (FIG. 17) to be used by selected Job E are displayed. In this case, for example, the medium information which is not set to any sheet holding unit (A3-size TWO-SIDED COATED PAPER 2) is highlighted to present to the user a sheet type which is not set to any sheet holding unit. Therefore, the user is able to know, before instructing to start printing, that media mismatch (sheet type mismatch) will occur when a sheet of the relevant sheet type is fed and the print job will stop if the START PRINTING button 1412 is pressed in this state. When the user recognizes that the mismatch mark 1431 is displayed, the user may take a suitable action, i.e., identifies another sheet holding unit (desirably a sheet holding unit which is not to be used by the print job), and changes the sheet setting of the sheet holding unit to the A3-size medium type "TWO-SIDED COATED PAPER 2". Further, the user supplies the applicable sheet type to the sheet holding unit. If a certain sheet type has already been set in the sheet holding unit, the user may replace it with the applicable sheet type.

In the present exemplary embodiment, as illustrated in FIG. 14C, the mismatch mark 1431 and the zero remaining amount mark 1432 have different shapes. This enables the user to distinguish between a case where a certain sheet type to be used by the job is not set to any sheet holding unit and a case where there is no remaining sheet amount although the relevant sheet type is set to any sheet holding unit. Thus, by making the media mismatch determination, the mismatch mark 1431 and the zero remaining amount mark 1432 can be displayed for print jobs in which media mismatch may possibly occur. Thus, the user can avoid stopping the print job.

When the user selects Job D and presses the DETAILS/CHANGE button 1411 in the state illustrated in FIG. 14C, the sheet size and the medium type (FIG. 17) to be used by Job D are displayed. At this timing, the CPU 212 blinks the sheet information indicating a zero remaining sheet amount. The CPU 212 further blinks display of the sheet holding unit in which the relevant sheet type is set. This enables the user to grasp the relevant sheet holding unit as well as information about the sheet size and the medium type which shows a zero remaining sheet amount, to be used by Job D. In this way, when displaying the sheet size and the medium type, the sheet information is displayed in different ways between a case where the relevant sheet type is not set to any sheet holding unit and a case where there is no remaining sheet amount. This enables the user to distinguish between a case where the sheet having the displayed sheet size and media type is not set to any sheet holding unit and a case where there is no remaining sheet amount. Although, in the above-described example, the sheet information about a medium type which is not set to any sheet holding unit is highlighted, and the sheet information about the zero remaining sheet amount are blinked, the configuration is not limited thereto. The mismatch mark 1431 and the zero remaining amount mark 1432 may also be displayed in association with the sheet information as warnings.

FIG. 11 is a flowchart illustrating the processing in step S1100 illustrated in FIG. 6, i.e., the processing for substituting the sheet type to be used by the selected print job. This processing is implemented when the CPU 212 of the controller unit 205 executes the UI function program loaded from the ROM 207 or the HDD 209 into the RAM 208.

In step S1101, the CPU 212 displays a SHEET SUBSTITUTION screen 1501 illustrated in FIG. 15 on the operation unit 204. The SHEET SUBSTITUTION screen 1501 displays a list of sheet types to be used by the selected print job as SHEET BEFORE CHANGE. In the example illustrated in FIG. 15, a list of sheet types to be used by the selected job (Job E) (A4 PLAIN PAPER 1, A4 COLORED PAPER (RED), and A3 TWO-SIDED COATED PAPER 2) is displayed as SHEET BEFORE CHANGE.

In step S1102, the CPU 212 waits for a user operation on the SHEET SUBSTITUTION screen 1501 illustrated in FIG. 15 displayed on the operation unit 204. In this case, the CPU 212 remains in and repeats step S1102 until the user performs a certain operation. When the user performs a certain operation on the operation unit 204 (YES in step S1102), the CPU 212 proceeds to step S1103.

In step S1103, the CPU 212 determines whether the user operation is an event of selecting a sheet type before change. Although, in the example illustrated in FIG. 15, the user is able to select a sheet type from all of the sheet types to be used by the job, the configuration is not limited thereto. If the media mismatch determination has already been performed in the relevant print job, selectable sheet types may be limited to sheet types about which media mismatch is occurring, by graying out and excluding from selection the sheet types about which media mismatch is not occurring. When it is determined that the user operation is an event of selecting the sheet type before change (YES in step S1103), the CPU 212 proceeds to step S1104.

In step S1104, the CPU 212 determines whether the sheet type selected in step S1103 has already been in a selected state. In the example illustrated in FIG. 15, "A3 TWO-SIDED COATED PAPER 2" is highlighted, as illustrated in a column 1503, and the user can know that the relevant sheet type has already been in the selected state. Further, "A4 PLAIN PAPER 1" is displayed without highlight, as illustrated in a column 1502, and the user can know that the relevant sheet type is not in the selected state.

When it is determined that the sheet type selected in step S1103 has already been in the selected state (YES in step S1104), then in step S1105, the CPU 212 cancels the selected state of the relevant sheet type, and returns to step S1102. On the other hand, when it is determined that the sheet type has not been in the selected state (NO in step S1104), then in step S1106, the CPU 212 changes the relevant sheet type to the selected state, and returns to step S1102.

On the other hand, when it is determined that the user operation is not an event of selecting the sheet type before change (NO in step S1103), the CPU 212 proceeds to step S1107.

In step S1107, the CPU 212 determines whether the user operation is an event of pressing the SELECT SHEET AFTER CHANGE button 1505 illustrated in FIG. 15. When the sheet type before change is not in the selected state, the SELECT SHEET AFTER CHANGE button 1505 may be grayed out (disabled). When it is determined that the user operation is an event of pressing the SELECT SHEET AFTER CHANGE button 1505 (YES in step S1107), the CPU 212 proceeds to step S1108.

In step S1108, the CPU 212 sets information about the substitute sheet selected by the user from among the substitute sheet candidates, to the sheet type before change in the selected state, and returns to step S1102. The substitute sheet information which can be set in step S1108 is sheet information already stored as setting values of the sheet holding unit. In the example illustrated in FIG. 15, the CPU 212 sets "A3 PLAIN PAPER 1" as the substitute sheet information of the sheet type before change (A3 TWO-SIDED COATED PAPER 2), as the sheet type after change.

On the other hand, when it is determined that the user operation is not an event of pressing the SELECT SHEET AFTER CHANGE button 1505 (NO in step S1107), the CPU 212 proceeds to step S1109.

In step S1109, the CPU 212 determines whether the user operation is an event of pressing a TO SHEET BEFORE CHANGE button 1504 illustrated in FIG. 15. When the user operation is determined to be an event of pressing the TO SHEET BEFORE CHANGE button 1504 (YES in step S1109), the CPU 212 proceeds to step S1110. The TO SHEET BEFORE CHANGE button 1504 is grayed out (disabled) for sheet types to which the substitute sheet information is not set.

In step S1110, the CPU 212 deletes the substitute sheet information set to the sheet type before change in the selected state, and returns to step S1102.

On the other hand, when it is determined that the user operation is not an event of pressing the TO SHEET BEFORE CHANGE button 1504 (NO in step S1109), the CPU 212 proceeds to step S1111.

In step S1111, the CPU 212 determines whether the user operation is an event of pressing an OK button 1507 illustrated in FIG. 15. When it is determined that the user operation is an event of pressing the OK button 1507 (YES in step S1111), then in step S1112, the CPU 212 sets the substitute sheet information set to the sheet type to be used by the print job and stores in the HDD 209 the substitute sheet information in association with the relevant print job. Then, the CPU 212 ends the processing in step S1100 illustrated in FIG. 6, i.e., the substitution processing for the sheet type to be used by the print job, and returns to step S601 illustrated in FIG. 6.

On the other hand, when it is determined that the user operation is not an event of pressing the OK button 1507 (NO in step S1111), then in step S1113, the CPU 212 determines whether the user operation is an event of pressing a CANCEL button 1506 illustrated in FIG. 15. When it is determined that the user operation is an event of pressing the CANCEL button 1506 (YES in step S1113), then in step S1114, the CPU 212 cancels all of the substitute sheet information set to the sheet type to be used by the print job. Then, the CPU 212 ends the processing in step S1100 illustrated in FIG. 6, i.e., the substitution processing for the sheet type to be used by the print job, and returns to step S601 illustrated in FIG. 6.

On the other hand, when it is determined that the user operation is not an event of pressing the CANCEL button 1506 (NO in step S1113), then in step S1115, the CPU 212 performs other processing according to the user operation, and returns to step S1102. The processing in step S1115 can be, for example, sequentially displaying the information of all of the sheet types to be used by the selected print job by pressing the scroll buttons 1508 and 1509.

The above is detailed descriptions of the processing in step S1100 illustrated in FIG. 6, i.e., the substitution processing for the sheet type to be used by the print job.

FIG. 12 is a flowchart illustrating the processing in step S1200 of FIG. 6, i.e., the mismatch job count and selected job count update and notification according to the first exemplary embodiment. This processing is implemented when the CPU 212 of the controller unit 205 executes the UI function program loaded from the ROM 207 or the HDD 209 into the RAM 208. The processing of the flowchart illustrated in FIG. 12 is started in a state where the job hold screen 1401 is displayed on the operation unit 204, and print jobs are selected, as illustrated in FIG. 14B. The processing in step S1200 is started in a state where the number of print jobs in the selected state and the number of print jobs in which media mismatch is occurring (hereinafter referred to as media mismatch print jobs) out of print jobs in the selected state have been counted, and these values are retained in respective counters. The values of respective counters are stored in the HDD 209 or the RAM 208, and these values are read and written as required.

In step S1201, the CPU 212 determines whether the job which received a selection event has already been in the selected state. When it is determined that the relevant job has already been in the selected state (YES in step S1201), then in step S1202, the CPU 212 cancels the selected state of the job which has received a selection event, and proceeds to step S1203.

In step S1203, the CPU 212 determines whether the relevant job released from the selected state in step S1202 is a media mismatch job. The CPU 212 can determine whether the job is a media mismatch job by referring to the value of the above-described flag indicating the result of the media mismatch determination for the relevant job.

When it is determined that the relevant job released from the selected state in step S1202 is a media mismatch job (YES in step S1203), then in step S1204, the CPU 212 decrements the value of the mismatch job count by one to update the counter value, and proceeds to step S1205. On the other hand, when it is determined that the relevant job is not a media mismatch job (NO in step S1203), the CPU 212 proceeds to step S1205.

In step S1205, the CPU 212 decrements the selected job count by one to update the counter value, and proceeds to step S1210.

In step S1210, the CPU 212 refers to the updated values of respective counters stored in the HDD 209 or the RAM 208. Then, as illustrated in FIG. 14C, the CPU 212 displays a mismatch job count 1433 and a selected job count 1434 on the job hold screen 1401.

In the example illustrated in FIG. 14C, "MISMATCH OCCURRENCE COUNT: 2/3" indicates that the media mismatch is occurring in two out of three print jobs in the selected state. After completion of the processing in step S1210, the CPU 212 ends the processing in step S1200 illustrated in FIG. 6, i.e., the mismatch job count and selected job count update and notification, and returns to step S601 illustrated in FIG. 6.

On the other hand, when it is determined that the job which has received a selection event is not been in the selected state (NO in step S1201), then in step S1206, the CPU 212 changes the job which has received a selection event to the selected state, and proceeds to step S1207.

In step S1207, the CPU 212 determines whether the relevant job changed to the selected state in step S1206 is a media mismatch job. The CPU 212 can determine whether the relevant job is a media mismatch job by referring to the value of the above-described flag indicating the result of the media mismatch determination for the relevant job.

When it is determined that the relevant job changed to the selected state in step S1206 is a media mismatch job (YES in step S1207), then in step S1208, the CPU 212 increments the value of the mismatch job count by one to update the counter value, and proceeds to step S1209. On the other hand, when it is determined that the relevant job is not a media mismatch job (NO in step S1207), the CPU 212 proceeds to step S1209.

In step S1209, the CPU 212 increments the selected job count to update the counter value, and proceeds to step S1210.

The above is detailed descriptions of the processing illustrated in step S1200 illustrated in FIG. 6, i.e., the mismatch job count and selected job count update and notification. The CPU 212 can also apply the processing in steps S1202 to S1205 not only to a job released from the selected state but also to a job which has received an instruction for deletion from the hold job list 1402.

FIG. 13 is a flowchart illustrating the processing in step S1300 of FIG. 6, i.e., the mismatch job count update and notification according to the first exemplary embodiment. This processing is implemented when the CPU 212 of the controller unit 205 executes the UI function program loaded from the ROM 207 or the HDD 209 into the RAM 208. The processing of the flowchart illustrated in FIG. 13 is started in a state where the job hold screen 1401 is displayed on the operation unit 204, print jobs are selected, and the user is notified of the result of the media mismatch determination, as illustrated in FIG. 14C. The processing in step S1300 is started in a state where the number of media mismatch print jobs is counted out of print jobs in the selected states, and the value is retained in the relevant counter. The values of respective counters are stored in the HDD 209 or the RAM 208, and these values are read and written as required.

In step S1301, the CPU 212 determines whether there is any job changed from the mismatch state to the non-mismatch state as a result of the media mismatch determination in step S700 illustrated in FIG. 6. Example cases where a job is changed from the mismatch state to the non-mismatch state include a case where mismatch is canceled by the above-described sheet substitution processing (in step S1100) and a case where mismatch is canceled by changing the attribute information to be set to the sheet holding unit. A change in the media mismatch state can be determined by referring to a change in the value of the above-described flag indicating the result of the media mismatch determination for the relevant job.

When the CPU determines that there is any job changed from the mismatch state to the non-mismatch state (YES in step S1301), then in step S1302, the CPU 212 decrements the value of the mismatch job count to update the counter value by the number of jobs changed from the mismatch state to the non-mismatch state, and proceeds to step S1303. On the other hand, when there is no job changed from the mismatch state to the non-mismatch state (NO in step S1301), the CPU 212 proceeds to step S1303.

In step S1303, the CPU 212 determines whether there is any job changed from the non-mismatch state to the mismatch state. A change in the media mismatch state can be determined by referring to a change in the value of the above-described flag indicating the result of the media mismatch determination for the relevant job. When the CPU 212 determines that there is any job changed from the non-mismatch state to the mismatch state (YES in step S1303), then in step S1304, the CPU 212 increments the value of the mismatch job count to update the counter value by the number of jobs changed from the non-mismatch state to the mismatch state, and proceeds to step S1305. On the other hand, when the CPU 212 determines that there is no job changed from the non-mismatch state to the mismatch state (NO in step S1303), the CPU 212 proceeds to step S1305.

In step S1305, the CPU 212 refers to the updated value of the counter stored in the HDD 209 or the RAM 208. Then, as illustrated in FIG. 14C, the CPU 212 displays the mismatch job count 1433 on the job hold screen 1401. After completion of the processing in step S1305, the CPU 212 ends the processing in step S1300 illustrated in FIG. 6, i.e., the mismatch job count update and notification, and returns to step S601 illustrated in FIG. 6.

The above is detailed descriptions of the processing illustrated in step S1300 of FIG. 6, i.e., the mismatch job count update and notification.

As described above, the first exemplary embodiment numerically displays on the job hold screen 1401 the number of media mismatch print jobs (mismatch job count 1433) out of the print jobs in the selected state, together with the number of print jobs in the selected state (selected job count 1434). Further, according to the job selection operation and job deselection operation, the CPU 212 updates the mismatch job count 1433 and the selected job count 1434, and numerically displays these values on the job hold screen 1401. This enables the user, before starting printing of a plurality of selected print jobs, to easily grasp the number of media mismatch print jobs out of the plurality of selected print jobs.

In the first exemplary embodiment, the number of media mismatch print jobs (mismatch job count 1433), and the number of print jobs in the selected state (selected job count 1434) are displayed out of the print jobs in the selected state on the job hold screen 1401, the configuration is not limited thereto. Only the number of media mismatch print jobs (mismatch job count 1433) may be displayed out of the print jobs in the selected state on the job hold screen 1401 without displaying the number of print jobs in the selected state (selected job count 1434). Further, in addition to the mismatch job count 1433 and selected job count 1434, the number of sheet types in which media mismatch is occurring may be counted out of the print jobs in the selected state and displayed on the job hold screen 1401.

In the first exemplary embodiment, the mismatch job count 1433 is counted and displayed without distinguishing between jobs in the sheet type mismatch state and jobs in the zero remaining sheet amount state. On the other hand, the number of jobs in the sheet type mismatch state and the number of jobs in the zero remaining sheet amount state may be counted by distinguishing between the number of jobs in the sheet type mismatch state and the number of jobs in the zero remaining sheet amount state, and separately displayed on the job hold screen 1401.

In the above-described first exemplary embodiment, the number of media mismatch print jobs (mismatch job count 1433) is displayed out of the print jobs in the selected state on the job hold screen 1401 illustrated in FIG. 14C, together with the number of print jobs in the selected state (selected job count 1434).

On the other hand, a second exemplary embodiment will be described below based on a case where only media mismatch jobs are displayed on the job hold screen 1401, in addition to the processing for displaying the mismatch job count 1433 and the selected job count 1434 on the job hold screen 1401.

Figure 18:
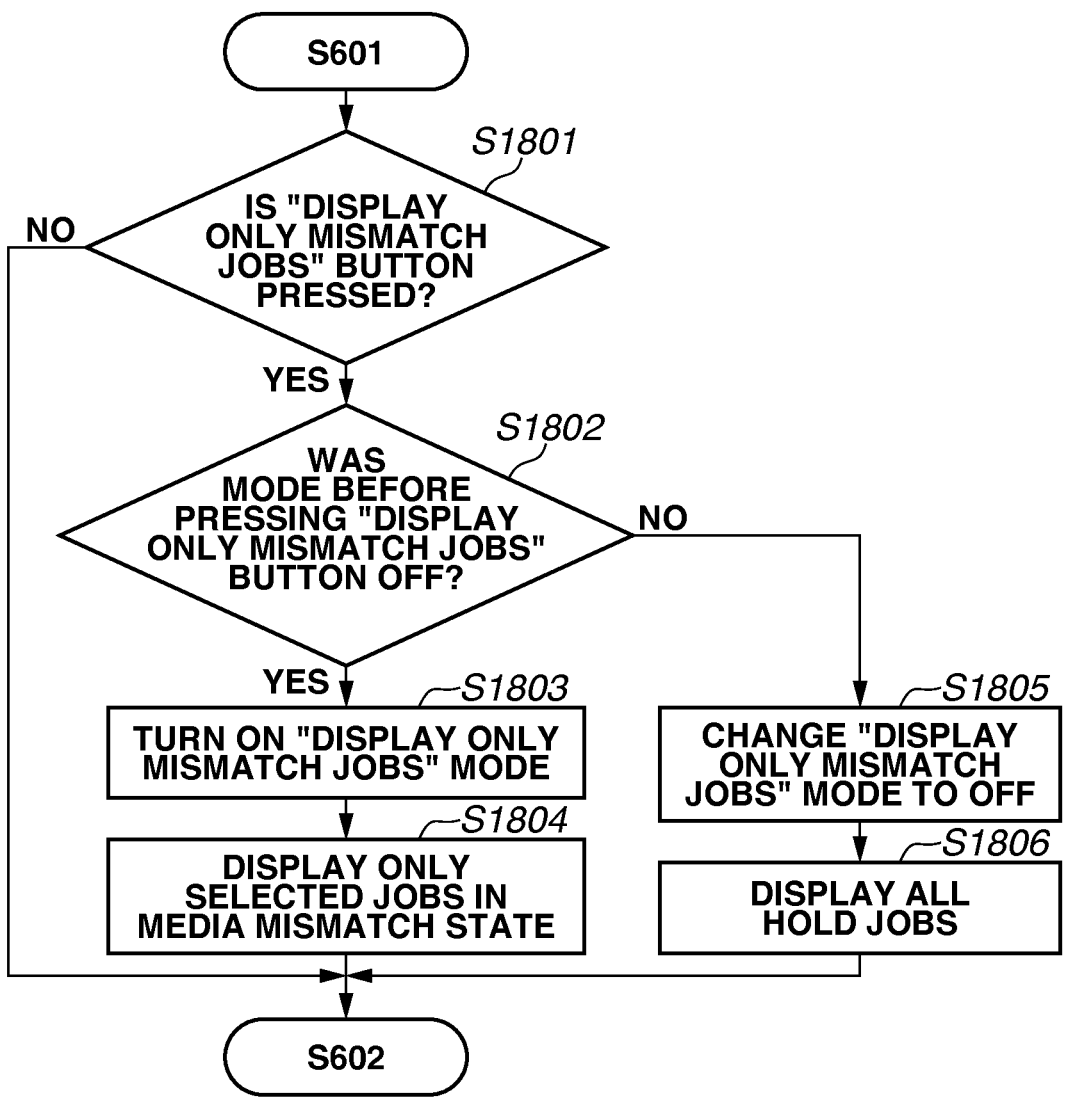
FIG. 18 is a flowchart illustrating processing for displaying only mismatch jobs on a job hold screen in a digital printer according to a second exemplary embodiment.

A series of flowcharts illustrating processing by the digital printer 102 according to the second exemplary embodiment is similar to the flowcharts illustrated in FIGS. 6 to 13 described in the first exemplary embodiment, and redundant descriptions thereof will be omitted. The second exemplary embodiment differs from the first exemplary embodiment in the processing in steps S601 and S602 illustrated in FIG. 6. Therefore, the processing in steps S601 and S602 according to the second exemplary embodiment will be described in detail below with reference to the flowchart illustrated in FIG. 18.

In the second exemplary embodiment, when it is determined that a certain operation has been performed on the job hold screen 1401 (YES in step S601), the CPU 212 proceeds to step S1801.

Figure 19:
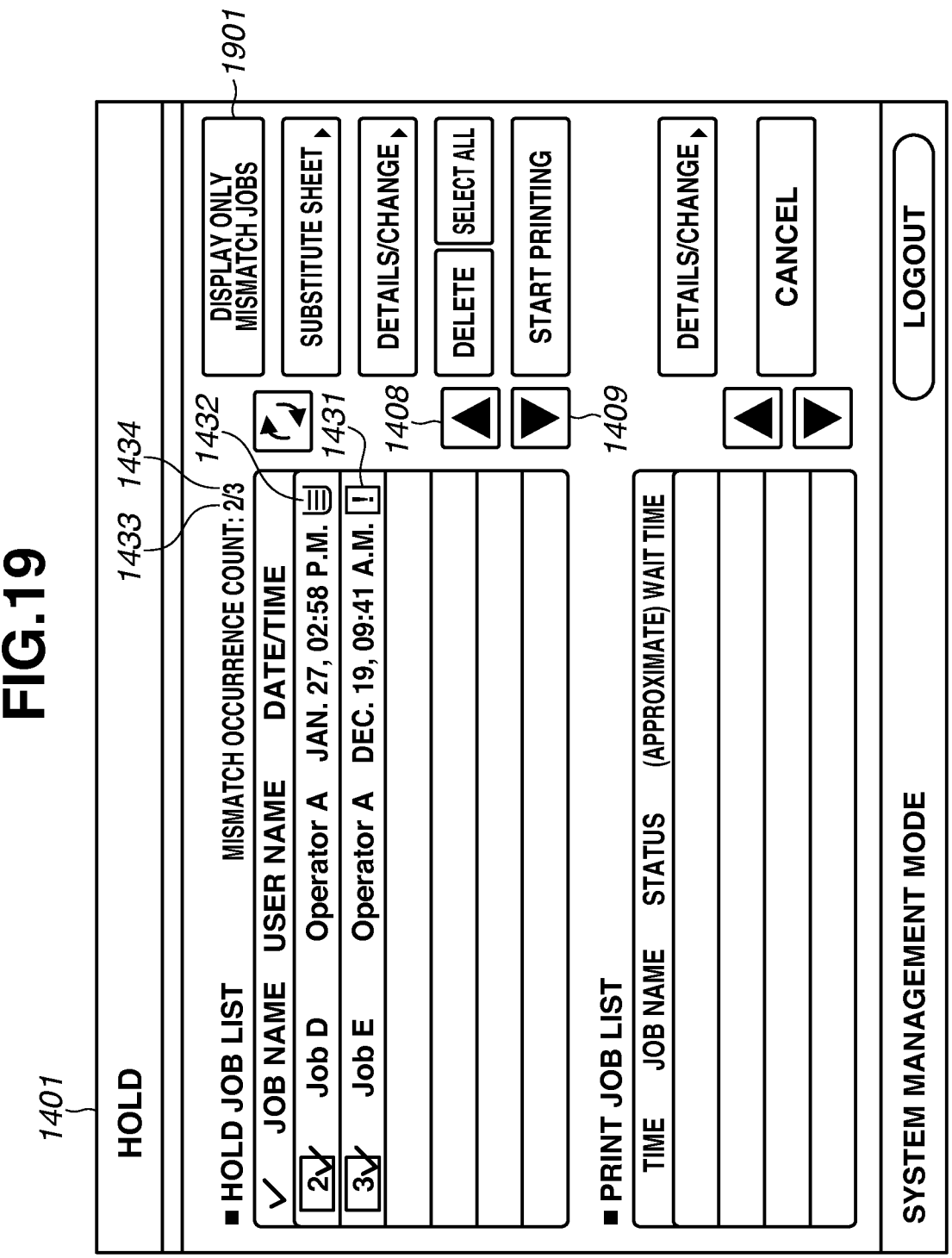
FIG. 19 illustrates an example of a job hold function operation screen displayed in an operation unit of the digital printer according to the second exemplary embodiment.

In step S1801, the CPU 212 determines whether the DISPLAY ONLY MISMATCH JOBS button 1901 illustrated in FIG. 19 is pressed. Each time the DISPLAY ONLY MISMATCH JOBS button 1901 is pressed, the mode for displaying only media mismatch jobs in the hold job list 1402 is turned ON or OFF. For example, the CPU 212 may enable the user to recognize whether the relevant mode is ON or OFF by shading or highlighting the DISPLAY ONLY MISMATCH JOBS button 1901 only when the relevant mode is ON.

When it is determined that the DISPLAY ONLY MISMATCH JOBS button 1901 is pressed (YES in step S1801), the CPU 212 proceeds to step S1802.

In step S1802, the CPU 212 determines whether the relevant mode before the DISPLAY ONLY MISMATCH JOBS button 1901 is pressed was OFF. When it is determined that the relevant mode has been OFF (YES in step S1802), then in step S1803, the CPU 212 changes the "display only mismatch jobs" mode to ON. In step S1804, the CPU 212 displays only selected media mismatch jobs in the hold job list 1402, as illustrated in FIG. 19, and proceeds to step S602 to perform subsequent processing.

On the other hand, when it is determined that the relevant mode has been ON (NO in step S1802), then in step S1805, the CPU 212 changes the "display only mismatch jobs" mode to OFF. In step S1806, the CPU 212 displays in the hold job list 1402 all of the jobs being held, as illustrated in FIG. 14C, and proceeds to step S602 to perform subsequent processing.

On the other hand, when it is determined that the DISPLAY ONLY MISMATCH JOBS button 1901 is not pressed (NO in step S1801), the CPU 212 proceeds to step S602 to perform subsequent processing.

The above is detailed descriptions of the processing for displaying media mismatch print jobs according to the second exemplary embodiment.

As described above, according to the second exemplary embodiment, a function of limiting jobs displayed on the job hold screen 1401 to media mismatch jobs is provided, in addition to the function of displaying the mismatch job count 1433 and selected job count 1434 on the job hold screen 1401. This enables the user, before starting printing for a plurality of selected print jobs, to easily grasp only media mismatch print jobs out of the plurality of selected print jobs.

According to the above-described second exemplary embodiment, a function of displaying only media mismatch jobs on the job hold screen 1401 is provided, in addition to the function of displaying the mismatch job count 1433 and selected job count 1434 on the job hold screen 1401 illustrated in FIG. 14C.

On the other hand, in a state where all of the jobs being held are displayed in the hold job list 1402, when a media mismatch job exists outside the display page of the hold job list 1402 illustrated in FIG. 14C, the user may preferably grasp where the relevant job exists outside the display page.

A third exemplary embodiment will be described below based on a case where the user is notified of where a mismatch job exists in the hold job list 1402, in addition to the processing for displaying the mismatch job count 1433 and the selected job count 1434 on the job hold screen 1401.

Figure 20:
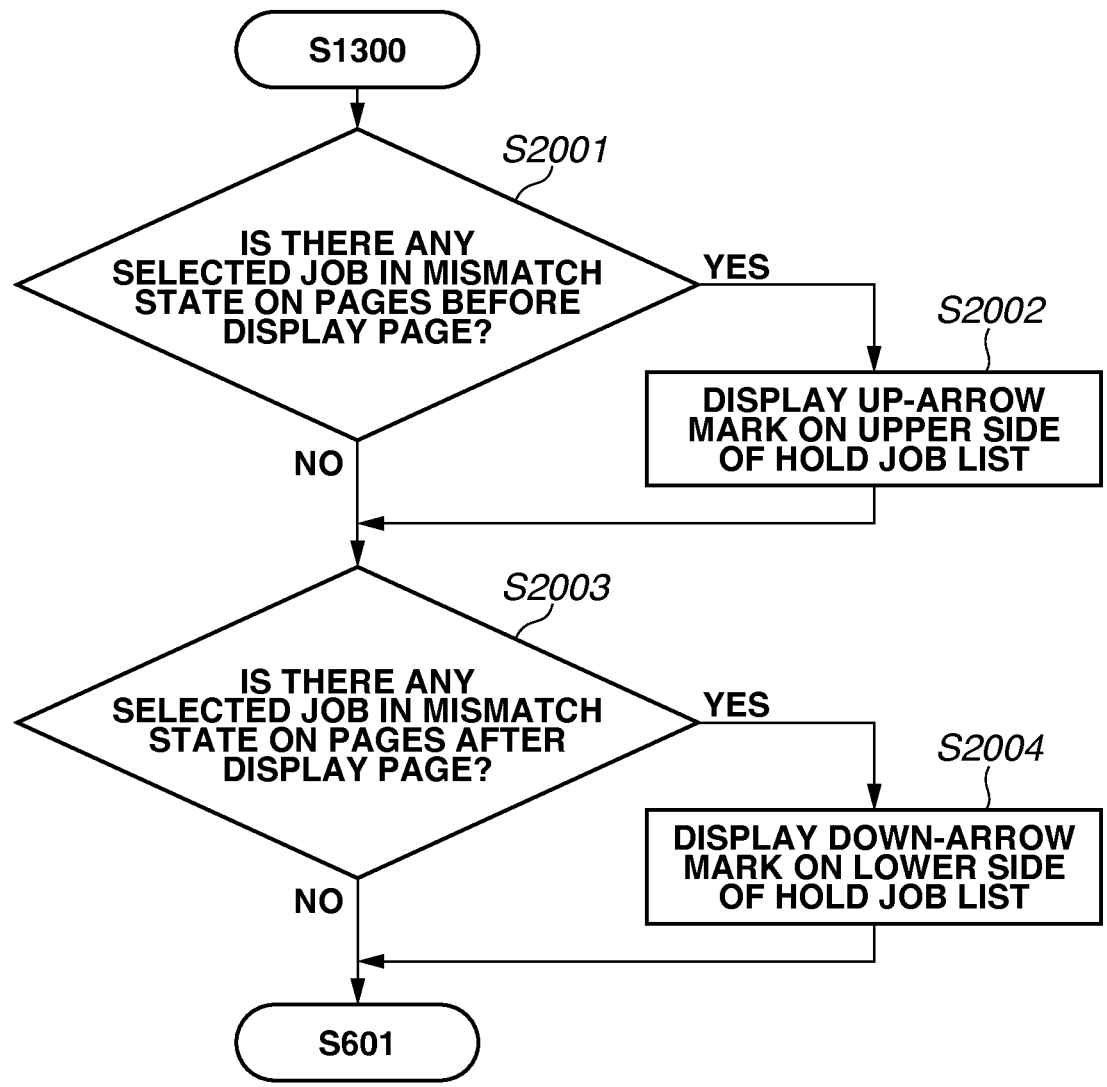
FIG. 20 is a flowchart illustrating processing for notifying the user of where a mismatch job exists in a hold job list, in a digital printer according to a third exemplary embodiment.

A series of flowcharts illustrating processing by the digital printer 102 according to the third exemplary embodiment is similar to the flowcharts illustrated in FIGS. 6 to 13 described in the first exemplary embodiment, and redundant descriptions thereof will be omitted. The third exemplary embodiment differs from the first exemplary embodiment in the processing in steps S1300 and S601 illustrated in FIG. 6. Therefore, the processing in steps S1300 and S601 according to the third exemplary embodiment will be described in detail below with reference to the flowchart illustrated in FIG. 20.

In the third exemplary embodiment, the CPU 212 performs the mismatch job count update and notification in step S1300 illustrated in FIG. 6, and proceeds to step S2001.

In step S2001, the CPU 212 determines whether there is a media mismatch job in the selected state on pages preceding the display page of the hold job list 1402. When the CPU 212 determines that there is a media mismatch job in the selected state on pages preceding the display page (YES in step S2001), then in step S2002, the CPU 212 displays an up-arrow mark 2101 on the upper side of the hold job list 1402, as illustrated in FIG. 21, and proceeds to step S2003. On the other hand, when the CPU 212 determines that there is no media mismatch job in the selected state on pages preceding the display page (NO in step S2001), the CPU 212 proceeds to step S2003.

In step S2003, the CPU 212 determines whether there is a media mismatch job in the selected state on pages following the display page of the hold job list 1402. When the CPU 212 determines that there is a media mismatch job in the selected state on pages following the display page (YES in step S2003), then in step S2004, the CPU 212 displays a down-arrow mark 2102 on the lower side of the hold job list 1402, as illustrated in FIG. 21, and returns to step S601. On the other hand, when the CPU 212 determines whether there is no media mismatch job in the selected state on pages following the display page (NO in step S2003), the CPU 212 returns to step S601, and performs subsequent processing.

The above is detailed descriptions of the processing for notifying the user of where a media mismatch job exists in the hold job list 1402 according to the third exemplary embodiment.

As described above, in the third exemplary embodiment, a function of notifying the user of where a mismatch job exists in the hold job list 1402 is provided, in addition to the function of displaying the mismatch job count 1433 and the selected job count 1434. This enables the user, before starting printing for a plurality of selected print jobs, to easily grasp a media mismatch job out of the plurality of selected print jobs.

Although, in the third exemplary embodiment, the up-arrow mark 2101 and the down-arrow mark 2102 are displayed, as illustrated in FIG. 21, the configuration is not limited thereto. As long as the user is able to recognize where a media mismatch job exists in the hold job list 1402, different marks corresponding to the up-arrow mark 2101 and the down-arrow mark 2102 may be displayed.

In the first, the second, and the third exemplary embodiments described above, the CPU 212 displays the mismatch job count 1433 and the selected job count 1434 on the job hold screen 1401 illustrated in FIG. 14C to enable the user to grasp the number of mismatch jobs out of selected jobs.

A fourth exemplary embodiment will be described below based on a case where, when the media mismatch determination is made and the user is notified of the result of the relevant media mismatch determination, the user is notified of a list of media mismatch print jobs in the selected state.

Figure 22:
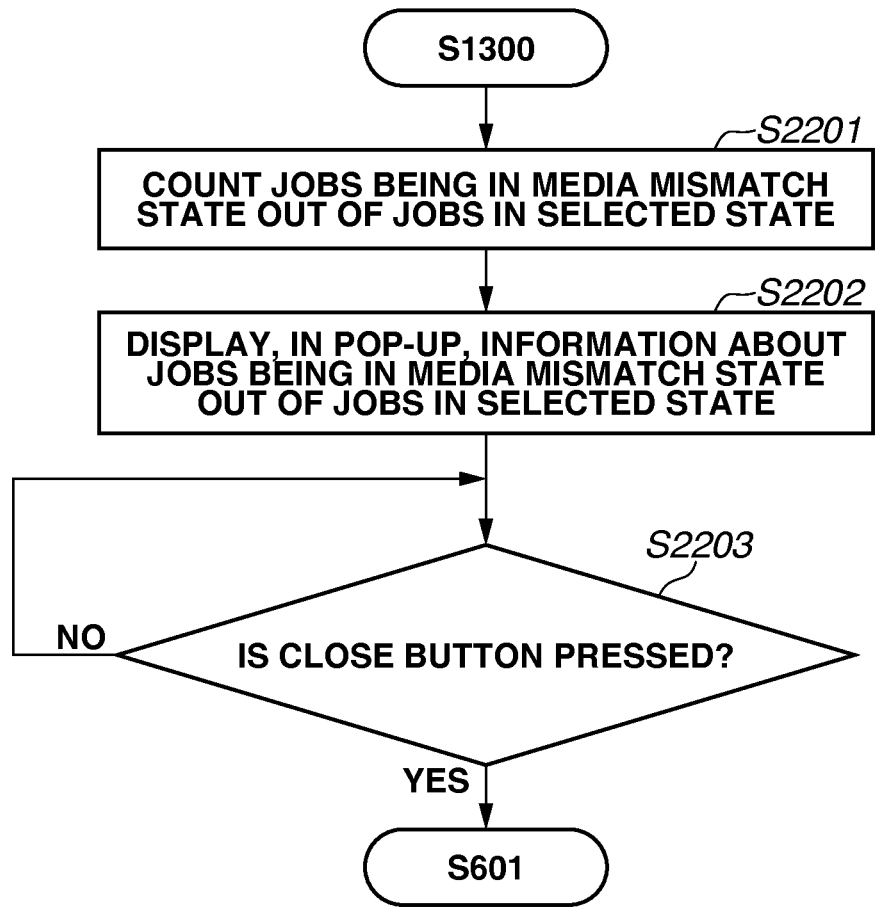
FIG. 22 is a flowchart illustrating processing for notifying the user of a list of mismatch jobs out of selected jobs in a digital printer according to a fourth exemplary embodiment.

A series of flowcharts illustrating processing by the digital printer 102 according to the fourth exemplary embodiment is similar to the flowcharts illustrated in FIGS. 6 to 13 described in the first exemplary embodiment, and redundant descriptions thereof will be omitted. The fourth exemplary embodiment differs from the first exemplary embodiment in the processing in steps S1300 and S601 illustrated in FIG. 6. Therefore, the processing in steps S1300 and S601 according to the fourth exemplary embodiment will be described in detail below with reference to the flowchart illustrated in FIG. 22.

In the fourth exemplary embodiment, the CPU 212 performs the mismatch job update and notification processing in step S1300 illustrated in FIG. 6, and proceeds to step S2201.

In step S2201, the CPU 212 counts the number of media mismatch print jobs out of jobs in the selected state. The number of media mismatch print jobs can be counted by referring to the above-described flag indicating the result of the media mismatch determination for all jobs in the selected state.

In step S2202, based on the result of the counting in step S2201, the CPU 212 displays a pop-up screen 2301 as illustrated in FIG. 23 on the job hold screen 1401 to provide information about media mismatch print jobs out of jobs in the selected state. In the example illustrated in FIG. 23, the pop-up screen 2301 displays the selection numbers of all of media mismatch print jobs. As long as the user is able to identify media mismatch print jobs, the pop-up screen 2301 may display the job name and the date and time when each job is stored in the digital printer 102 in addition to the selection number.

In step S2203, the CPU 212 determines whether a CLOSE button 2302 of the pop-up screen 2301 is pressed. When it is determined that the CLOSE button 2302 is pressed (YES in step S2203), the CPU 212 returns to step S601. On the other hand, when it is determined that the CLOSE button 2302 is not pressed (NO in step S2203), the CPU 212 remains in and repeats step S2203.

The above is detailed descriptions of the processing for notifying the user of a list of media mismatch print jobs in the selected state according to the fourth exemplary embodiment.

As described above, according to the fourth exemplary embodiment, a function of displaying on the pop-up screen 2301 a list of media mismatch print jobs in the selected state is provided, in addition to the function of displaying the mismatch job count 1433 and the selected job count 1434 on the job hold screen 1401. This enables the user, before starting printing for a plurality of selected print jobs, to easily grasp media mismatch print jobs out of the plurality of selected print jobs.

A list of media mismatch print jobs in the selected state is not limited to the pop-up screen 2301. The relevant list may be displayed in other columns in the job hold screen 1401, for example, at a portion displaying "SYSTEM MANAGEMENT MODE" on the job hold screen 1401 illustrated in FIG. 14C.

According to the above-described fourth exemplary embodiment, a function of displaying a list of media mismatch print jobs in the selected state on the pop-up screen 2301 illustrated in FIG. 23 is provided, in addition to the function of displaying the mismatch job count 1433 and the selected job count 1434 on the job hold screen 1401.

On the other hand, if the user wants to collectively cancel media mismatch print jobs, it may be more convenient for the user that relevant jobs are collectively displayed from the top of the first page of the hold job list 1402 giving priority to media mismatch print jobs. Further, if the user wants to collectively print jobs in which media mismatch is not occurring, it may be more convenient for the user that relevant jobs are collectively displayed from the top of the first page of the hold job list 1402 giving priority to jobs in which media mismatch is not occurring.

According to a fifth exemplary embodiment a sort setting function is provided, in addition to the function of displaying the mismatch job count 1433 and the selected job count 1434. When the sort setting is ON, jobs are sorted according to the result of the media mismatch determination, and displayed in the hold job list 1402 on a priority basis.

A series of flowcharts illustrating processing by the digital printer 102 according to the fifth exemplary embodiment is similar to the flowcharts illustrated in FIGS. 6 to 13 described in the first exemplary embodiment, and redundant descriptions thereof will be omitted. The fifth exemplary embodiment differs from the first exemplary embodiment in the processing in steps S601 and S602 illustrated in FIG. 6. Therefore, the processing in steps S602 and S601 according to the fifth exemplary embodiment will be described in detail below with reference to the flowchart illustrated in FIG. 24.

In the fifth exemplary embodiment, when it is determined that a certain operation has been performed on the job hold screen 1401 (YES in step S601), then in step S2401, the CPU 212 determines whether a sort setting (MISMATCH JOB PRIORITY) button 2501 illustrated in FIG. 25 is pressed. Each time the sort setting (MISMATCH JOB PRIORITY) button 2501 is pressed, three modes, "sort setting ON (mismatch job priority)", "sort setting ON (non-mismatch job priority)", and "sort setting OFF", are selected in this order.

When it is determined that the sort setting (MISMATCH JOB PRIORITY) button 2501 is pressed (YES in step S2401), the CPU 212 proceeds to step S2402. On the other hand, when it is determined that the sort setting (MISMATCH JOB PRIORITY) button 2501 is not pressed (NO in step S2401), the CPU 212 proceeds to step S602.

In step S2402, the CPU 212 determines whether the sort setting for jobs to be displayed in the hold job list 1402 is ON. When it is determined that the sort setting is ON (YES in step S2402), the CPU 212 proceeds to step S2403.

In step S2403, the CPU 212 determines whether the sort setting is mismatch job priority. When the CPU 212 determines that the sort setting is mismatch job priority (YES in step S2403), then in step S2404, the CPU 212 sorts selected jobs having undergone the media mismatch determination, and displays the relevant jobs in the hold job list 1402 on a mismatch job priority basis. As a method for displaying jobs on a mismatch job priority basis, for example, jobs are sorted and displayed in order of "sheet type mismatch jobs", "zero remaining sheet amount jobs", and "non-mismatch jobs" from the top of the first page of the hold job list 1402 (refer to FIG. 25). The CPU 212 can determine whether a selected job is a sheet type mismatch job, a zero remaining sheet amount job, or a non-mismatch job by referring to the above-described flag indicating the result of the media mismatch determination.

On the other hand, when the CPU 212 determines that the sort setting is not mismatch job priority (NO in step S2403), then in step S2405, the CPU 212 sorts the selected jobs having undergone the media mismatch determination, and displays the relevant jobs in the hold job list 1402 on a non-mismatch job priority basis. As a method for displaying jobs on a non-mismatch job priority basis, for example, jobs are sorted and displayed in order of "non-mismatch jobs", "zero remaining sheet amount jobs", and "sheet type mismatch jobs" from the top of the first page of the hold job list 1402.

On the other hand, when he CPU 212 determines that the sort setting is not ON, i.e., the sort setting is OFF (NO in step S2402), then in step S2406, the CPU 212 does not sort jobs, and normally displays jobs in the hold job list 1402, as illustrated in FIG. 14C.

After completion of the above-described processing in step S2404, S2405, or S2406, the CPU 212 proceeds to step S602.

The above is detailed descriptions of the processing for sorting and displaying jobs on a priority basis in the hold job list 1402 according to the result of the media mismatch determination when the sort setting is ON.

As described above, according to the fifth exemplary embodiment, a function of sorting and displaying jobs on a priority basis according to the result of the media mismatch determination is provided when the sort setting is ON, in addition to the function of displaying the mismatch job count 1433 and the selected job count 1434 on the job hold screen 1401. This enables the user, before starting printing of a plurality of selected print jobs, to easily grasp media mismatch print jobs out of the plurality of selected print jobs.

According to the fifth exemplary embodiment, sheet type mismatch jobs are displayed from the top of the hold job list 1402 in preference to zero remaining sheet amount jobs when the sort setting is ON (mismatch job priority). However, the configuration is not limited thereto. Zero remaining sheet amount jobs may be displayed from the top of the hold job list 1402 in preference to sheet type mismatch jobs.

The present invention is not limited to the above-described exemplary embodiments, and can be modified in diverse ways (including organic combinations of these exemplary embodiments) without departing from the spirit and scope thereof. These modifications are not excluded from the scope of the present invention.

Although, in the present exemplary embodiment, the CPU 212 of the controller unit 205 in the digital printer 102 serves an entity of the above-described various control, a part or whole of the above-described various control may be executable by a print control apparatus, such as an external controller provided separately from the digital printer 102.

While the present invention have specifically been described based on the above-described exemplary embodiments, the spirit and scope of the present invention are not limited to specific descriptions within the specification, for those skilled in the art.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-156717, filed Jul. 29, 2013 which is hereby incorporated by reference herein in its entirety.

What is claimed is:

1. A control apparatus comprising:
   a holding unit configured to hold jobs;
   a storing unit configured to store attribute information of sheets, wherein the sheets are to be stored in sheet holding units;
   a receiving unit configured to receive an instruction to execute at least one of the jobs held in the holding unit;
   a counting unit configured to count, from among the jobs held in the holding unit, the number of jobs where attribute information of a sheet to be used by a job does not correspond to the sheets attribute information stored in the storing unit; and
   a notification unit configured to notify, before the instruction to execute at least one of the jobs held in the holding unit is received by the receiving unit, a user of the number counted by the counting unit.

2. A control apparatus according to claim 1, further comprising a display unit configured to display the jobs held in the holding unit,
   wherein, even if a differ job held in the holding unit where attribute information of a sheet to be used by the differ job does not correspond to the sheets attribute information stored in the storing unit is not displayed on the display unit, the notification unit notifies a user of the number counted by the counting unit.

3. A control apparatus according to claim 1, wherein the notification unit further notifies a user of identification information about a differ job held in the holding unit where attribute information of a sheet to be used by the differ job does not correspond to the sheets attribute information stored in the storing unit.

4. A control apparatus according to claim 1, further comprising a display unit configured to display the jobs held in the holding unit,
   wherein, even if a differ job held in the holding unit where attribute information of a sheet to be used by the differ job does not correspond to the sheets attribute information stored in the storing unit is not displayed on the display unit, the notification unit further notifies a user that the differ job is not displayed on the display unit.

5. A control apparatus according to claim 1, further comprising a setting unit configured to make a setting such that (i) a user is notified of a differ job held in the holding unit where attribute information of a sheet to be used by the differ job does not correspond to the sheets attribute information stored in the storing unit, and (ii) a user is not notified of a correspond job held in the holding unit where attribute information of a sheet to be used by the correspond job corresponds to the sheets attribute information stored in the storing unit, based on a job notification instruction from a user,
   wherein, based on the setting made by the setting unit and before the instruction to execute at least one of the jobs held in the holding unit is received by the receiving unit, the notification unit notifies a user of the differ job without notifying a user of the correspond job.

6. A control apparatus according to claim 1, further comprising a setting unit configured to make a setting such that a user is notified of a differ job held in the holding unit where attribute information of a sheet to be used by the differ job does not correspond to the sheets attribute information stored in the storing unit, in preference to a correspond job held in the holding unit where attribute information of a sheet to be used by the correspond job corresponds to the sheets attribute information stored in the storing unit, based on a job notification instruction from a user,
   wherein, based on the setting made by the setting unit and before the instruction to execute at least one of the jobs held in the holding unit is received by the receiving unit, the notification unit notifies a user of the differ job in preference to the correspond job.

7. A control apparatus according to claim 1, further comprising an instruction unit configured to instruct the counting unit to further count the number of jobs, including the jobs held in the holding unit, where attribute information of a sheet to be used by a job does not correspond to the sheets attribute information stored in the storing unit,
   wherein, according to the instruction by the instruction unit, the counting unit counts the number of jobs where attribute information of a sheet to be used by a job does not correspond to the sheets attribute information stored in the storing unit.

8. A control apparatus according to claim 1, wherein the attribute information includes at least one of sheet size, sheet grammage, sheet surface property, sheet shape, and sheet color.

9. A control apparatus according to claim 1, further comprising:
   a display unit configured to display the jobs held in the holding unit; and a selecting unit configured to select at least one of the jobs displayed on the display unit, wherein the receiving unit receives the instruction to execute at least one of the jobs selected by the selecting unit.

10. A control apparatus comprising:

a holding unit configured to hold jobs;

a storing unit configured to store attribute information of sheets, wherein the sheets are to be stored in sheet holding units;

a receiving unit configured to receive an instruction to execute at least one of the jobs held in the holding unit;

a determining unit configured to determine, from among the jobs held in the holding unit, whether attribute information of a sheet to be used by a job held in the holding unit corresponds to the sheets attribute information stored in the storing unit;

a setting unit configured to make a setting such that (i) a user is notified of a differ job held in the holding unit where it is determined by the determining unit that attribute information of a sheet to be used by the differ job does not correspond to the sheets attribute information stored in the storing unit, and (ii) a user is not notified of a correspond job held in the holding unit where it is determined by the determining unit that attribute information of a sheet to be used by the correspond job corresponds to the sheets attribute information stored in the storing unit, based on a job notification instruction from a user; and a notification unit configured to notify, based on the setting made by the setting unit and before the instruction to execute at least one of the jobs held in the holding unit is received by the receiving unit, a user of the differ job without notifying a user of the correspond job.

11. A control method for a control apparatus, the control method comprising:

holding jobs in a holding unit;

storing, in a storing unit, attribute information of sheets, wherein the sheets are to be stored in sheet holding units;

receiving an instruction to execute at least one of the jobs held in the holding unit;

counting, from among the jobs held in the holding unit, the number of jobs where attribute information of a sheet to be used by a job does not correspond to the sheets attribute information stored in the storing unit; and notifying, before the instruction to execute at least one of the jobs held in the holding unit is received, a user of the counted number.

12. A non-transitory computer readable storage medium storing a program to cause a control apparatus to perform a control method, the control method comprising:

holding jobs in a holding unit;

storing, in a storing unit, attribute information of sheets, wherein the sheets are to be stored in sheet holding units;

receiving an instruction to execute at least one of the jobs held in the holding unit;

counting, from among the jobs held in the holding unit, the number of jobs where attribute information of a sheet to be used by a job does not correspond to the sheets attribute information stored in the storing unit; and notifying, before the instruction to execute at least one of the jobs held in the holding unit is received, a user of the counted number.

* * * * *